(12) United States Patent
Yamanaka et al.

(10) Patent No.: US 9,840,596 B2
(45) Date of Patent: Dec. 12, 2017

(54) POLYPHENYLENE SULFIDE BLOCK COPOLYMER AND MANUFACTURING METHOD THEREFOR

(71) Applicant: Toray Industries, Inc., Tokyo (JP)

(72) Inventors: Yuji Yamanaka, Nagoya (JP); Hiroyuki Isago, Nagoya (JP); Kei Saito, Nagoya (JP); Hideki Matsumoto, Nagoya (JP)

(73) Assignee: Toray Industries Inc. (JP)

( * ) Notice: Subject to any disclaimer, the term of this patent is extended or adjusted under 35 U.S.C. 154(b) by 0 days.

(21) Appl. No.: 15/129,873

(22) PCT Filed: Mar. 24, 2015

(86) PCT No.: PCT/JP2015/058855
§ 371 (c)(1),
(2) Date: Sep. 28, 2016

(87) PCT Pub. No.: WO2015/151921
PCT Pub. Date: Oct. 8, 2015

(65) Prior Publication Data
US 2017/0145165 A1   May 25, 2017

(30) Foreign Application Priority Data

Mar. 31, 2014 (JP) ................. 2014-071869
Oct. 30, 2014 (JP) ................. 2014-221202

(51) Int. Cl.
C08G 77/42 (2006.01)
C08G 81/00 (2006.01)
C08G 65/02 (2006.01)

(52) U.S. Cl.
CPC ............ C08G 81/00 (2013.01); C08G 77/42 (2013.01); C08G 65/02 (2013.01)

(58) Field of Classification Search
None
See application file for complete search history.

(56) References Cited

U.S. PATENT DOCUMENTS

| | | | | |
|---|---|---|---|---|
| 4,769,424 A * | 9/1988 | Takekoshi | ............ | C08G 73/106 525/420 |
| 5,194,566 A * | 3/1993 | Takekoshi | ............ | C08G 73/106 528/170 |
| 5,288,817 A * | 2/1994 | Yamamoto | .............. | C08L 81/02 524/500 |
| 5,324,796 A * | 6/1994 | Han | ........................ | C08L 81/02 525/474 |
| 8,017,697 B2 * | 9/2011 | Carrillo | .................... | C08L 71/12 525/393 |
| 2013/0079474 A1* | 3/2013 | Ramalingam | ........... | C08L 79/08 525/423 |
| 2013/0269977 A1* | 10/2013 | Luo | ........................... | B32B 1/08 174/110 SR |

FOREIGN PATENT DOCUMENTS

| | | |
|---|---|---|
| JP | 61-211340 A | 9/1986 |
| JP | 64-045433 A | 2/1989 |
| JP | 02-218423 A | 8/1990 |
| JP | 04-202363 A | 7/1992 |
| JP | 06-239972 A | 8/1994 |
| JP | 07-179610 A | 7/1995 |
| JP | 09-071652 A | 3/1997 |
| JP | 2004-300270 A | 10/2004 |
| JP | 2012-046721 A | 3/2012 |

OTHER PUBLICATIONS

Machine translation of JP-07179610, translation generated Mar. 2017, 5 pages.*

* cited by examiner

*Primary Examiner* — Robert S Loewe
(74) *Attorney, Agent, or Firm* — DLA Piper LLP (US)

(57) ABSTRACT

A polyphenylene sulfide block copolymer contains polyphenylene sulfide units and polyorganosiloxane units and has a glass-transition temperature in the range of 80° C. or lower and a weight-average molecular weight in the range of 35,000 to 100,000. The polyphenylene sulfide block copolymer has high flexibility as well as high heat resistance and heat aging resistance.

14 Claims, No Drawings

POLYPHENYLENE SULFIDE BLOCK COPOLYMER AND MANUFACTURING METHOD THEREFOR

TECHNICAL FIELD

This disclosure relates to polyphenylene sulfide block copolymers and methods of producing the same and. Particularly, to a polyphenylene sulfide block copolymer having high flexibility and high toughness as well as high heat resistance and heat aging resistance.

BACKGROUND

Polyarylene sulfides are resins having properties suitable for engineering plastics such as excellent heat resistance, barrier properties, chemical resistance, electrical insulating properties, moist heat resistance, and flame resistance. In particular, polyphenylene sulfide resins can be molded by injection molding and extrusion molding into various molded parts such as films, sheets, and fibers and have been widely used in the fields of electrical and electronic components, machine parts, automotive parts, and other, parts requiring heat resistance and chemical resistance.

Polyphenylene sulfide resins, however, are inferior to other engineering plastics in shock resistance, toughness, flexibility, and moldability and, to improve these properties, attempts have been made at modification by combination with dissimilar polymers. For example, one approach to providing polyphenylene sulfide with toughness and flexibility is to blend an olefinic elastomer. In this case, however, heat aging proceeds significantly under high-temperature conditions because of low heat resistance of the olefinic elastomer, resulting in low toughness and flexibility.

Against this background, studies have been made on methods of combining with polydimethylsiloxane, serving as a high-toughness and high-flexibility component that can withstand the use under high-temperature conditions.

Furthermore, since there is a limit to the modification by polymer alloying, studies have been made to provide higher toughness and higher flexibility, on combination methods for drastically modifying the main chain skeleton of polyphenylene sulfide by chemically bonding the polyphenylene sulfide to polydimethylsiloxane into a copolymer.

For example, studies have been made on methods of polymer alloying by blending polyphenylene sulfide with polydimethylsiloxane (see, for example, JP 2004-300270 A).

Furthermore, there have been reported methods of polymer alloying by blending a poly(ether imide-siloxane) copolymer, serving as a high-toughness and high-flexibility component to increase the compatibility between polyphenylene sulfide and polydimethylsiloxane (see, for example, JP 2012-46721 A).

As a method of producing a copolymer of polyphenylene sulfide and polydimethylsiloxane, there has been reported, for example, a method including introducing functional groups into the main chain of polyphenylene sulfide and reacting the polyphenylene sulfide with polydimethylsiloxane (see, for example, JP 07-179610 A).

Alternatively, there has been reported a method including block copolymerizing a polyphenylene sulfide with functional groups introduced into the end of the main chain with polydimethylsiloxane (see, for example, JP 64-45433 A).

According to the method of JP '270, the two polymers are incompatible with each other and not finely dispersed and, therefore, satisfactorily improved toughness and flexibility cannot be achieved.

According to the method of JP '721, provided is merely a blend of polyphenylene sulfide and a flexible component, and it was difficult to provide dramatically improved toughness and flexibility.

According to the method of JP '610, copolymerization reaction starts from the functional groups in the main chain of polyphenylene sulfide, and thus a copolymer in which polydimethylsiloxane is grafted is prepared. This copolymer is, therefore, not a block copolymer in which polydimethylsiloxane, a soft segment, is introduced into the main chain, and this polymer structure is not optimal to provide high flexibility and does not produce a sufficient modification effect.

According to the method of JP '433, the polyphenylene sulfide subjected to block co-polymerization has a low molecular weight comparable to those of oligomers and also has a small functional group content. Thus, block copolymerization reaction does not proceed sufficiently, only to provide a block copolymer having a low molecular weight. Furthermore, since the chain length of polyphenylene sulfide segments in the block copolymer is short, heat resistance and chemical resistance, which are inherent in polyphenylene sulfide, may be impaired.

As described above, it has been difficult, in the related art, to simultaneously achieve heat resistance, chemical resistance, high toughness, high flexibility, and heat aging resistance in polyphenylene sulfide.

It could therefore be helpful to provide a novel polyphenylene sulfide block copolymer having high flexibility and toughness with no reduction in heat resistance and chemical resistance, which are inherent in polyphenylene sulfide.

SUMMARY

We thus provide:

A polyphenylene sulfide block copolymer containing 50 to 99% by weight of polyphenylene sulfide units (A) and 50 to 1% by weight of polyorganosiloxane units (B), provided that the total amount of (A) and (B) is 100% by weight, the polyphenylene sulfide block copolymer having a glass-transition temperature of 80° C. or lower and a weight-average molecular weight of 35,000 to 100,000.

A method of producing the above-described polyphenylene sulfide block copolymer, including heating a polyphenylene sulfide (A) having a functional group content of 100 μmol/g or more and a polyorganosiloxane (B) having functional groups, the polyphenylene sulfide (A) being represented by general formula (I):

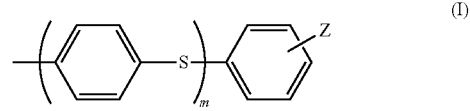

wherein Z is a reactive functional group selected from a carboxyl group, an amino group, a hydroxyl group, an acid anhydride group, an isocyanate group, an epoxy group, a silanol group, an alkoxysilane group, and derivatives thereof, and m is an integer of 10 or greater.

A molded article made of the above-described polyphenylene sulfide block copolymer.

In the polyphenylene sulfide block copolymer, the polyorganosiloxane units (B) are preferably polydimethylsiloxane units.

In the polyphenylene sulfide block copolymer, the polyorganosiloxane units (B) are preferably contained in an amount of 10 to 40% by weight.

The polyphenylene sulfide block copolymer preferably has a weight-average molecular weight of 45,000 to 80,000.

In the method of producing the polyphenylene sulfide block copolymer, heating the polyphenylene sulfide (A) and the polyorganosiloxane (B) is preferably carried out in an organic polar solvent.

In the method of producing the polyphenylene sulfide block copolymer, the polyorganosiloxane (B) having functional groups preferably has, at its ends, reactive functional groups selected from an epoxy group, a carboxyl group, an amino group, a hydroxyl group, an acid anhydride group, an isocyanate group, a silanol group, an alkoxysilane group, and derivatives thereof.

In the method of producing the polyphenylene sulfide block copolymer, the polyphenylene sulfide (A) having a functional group content of 100 µmol/g or more is preferably obtained by heating a mixture containing at least (i) a sulfidizing agent, (ii) a dihalogenated aromatic compound, (iii) an organic polar solvent, and (iv) a monohalogenated compound having a reactive functional group W, the amount of the monohalogenated compound being 0.01 to 25 mol % per mole of the dihalogenated aromatic compound (ii), the monohalogenated compound being represented by general formula (II) below:

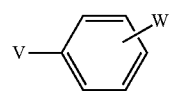

(II)

wherein V represents a halogen.

In the method of producing the polyphenylene sulfide block copolymer, the reactive functional group of the monohalogenated compound (iv) having a reactive functional group W is preferably a functional group selected from a carboxyl group, an amino group, a hydroxyl group, an acid anhydride group, an isocyanate group, an epoxy group, a silanol group, an alkoxysilane group, and derivatives thereof.

In the method of producing the polyphenylene sulfide block copolymer, the polyphenylene sulfide (A) is preferably a polyphenylene sulfide obtained by heating a cyclic polyphenylene sulfide (a) in the presence of a sulfide compound having reactive functional groups, the amount of the sulfide compound being 0.01 mol % to 25 mol % per mole of phenylene sulfide structural units, the sulfide compound being represented by general formula (III) below:

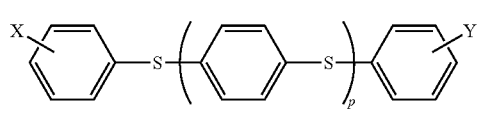

(III)

wherein at least one of X and Y is a functional group selected from a carboxyl group, an amino group, a hydroxyl group, an acid anhydride group, an isocyanate group, an epoxy group, a silanol group, an alkoxysilane group, and derivatives thereof, and p represents an integer of 0 to 20, provided that p may be a single integer or a combination of different integers.

In the method of producing the polyphenylene sulfide block copolymer, the cyclic polyphenylene sulfide (a) is preferably a monomer or a mixture comprising 50% by weight or more of a cyclic polyphenylene sulfide represented by general formula (IV) below wherein i is from 4 to 50:

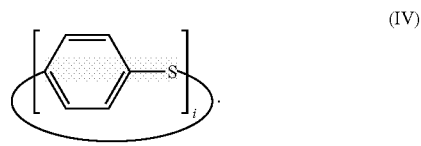

(IV)

In the method of producing the polyphenylene sulfide block copolymer, the polyphenylene sulfide (A) is preferably a polyphenylene sulfide obtained by heating a mixture containing at least the cyclic polyphenylene sulfide (a) and the sulfide compound having reactive functional groups in the absence of a solvent.

In the method of producing the polyphenylene sulfide block copolymer, the reactive functional groups of the sulfide compound having reactive functional groups are preferably functional groups selected from an amino group, a carboxyl group, and a hydroxyl group.

We provide a block copolymer simultaneously having high flexibility and high toughness with no reduction in heat resistance and chemical resistance, which are inherent in polyphenylene sulfide.

DETAILED DESCRIPTION (1) Polyphenylene Sulfide Block Copolymer

The polyphenylene sulfide block copolymer is a block copolymer containing polyphenylene sulfide units (A), represented by general formula (V) below, and polyorganosiloxane units (B), represented by general formula (VI).

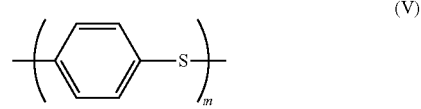

(V)

wherein m is an integer of 10 or greater. The upper limit of m is, for example, 200 or less, preferably 120 or less, and particularly preferably 80 or less to increase the weight fraction of polyorganosiloxane in the polyphenylene sulfide block copolymer to thereby achieve a sufficient modification.

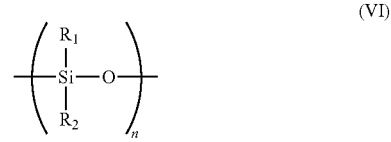

(VI)

wherein $R^1$ and $R^2$ each represent a C1 to C10 alkyl group or a C6 to C10 aromatic group. Specifically, for example, $R^1$ is an alkyl group such as methyl, ethyl, or propyl, or an aromatic group such as phenyl or naphthyl. n is, for example, 1 or greater, preferably 5 or greater, and particularly preferably 10 or greater. The upper limit of n is, for example, 100 or less, preferably 60 or less, and particularly preferably 40 or less in terms of compatibility with polyphenylene sulfide and organic polar solvent.

The polyorganosiloxane units (B) content of the polyphenylene sulfide block copolymer is 1% by weight to 50% by weight based on 100% by weight of the polyphenylene sulfide units (A) and the polyorganosiloxane units (B). Less than 1% by weight of the polyorganosiloxane units (B) in the polyphenylene sulfide block copolymer cannot provide sufficient flexibility and toughness, whereas more than 50% by weight of the polyorganosiloxane units (B) tends to inhibit properties derived from the polyphenylene sulfide units (A) such as heat resistance and chemical resistance, from being expressed. The upper limit of the polyorganosiloxane units (B) content is preferably 45% by weight or less, more preferably 40% by weight or less, and particularly preferably 35% by weight or less in terms of moldability. The lower limit of the polyorganosiloxane units (B) content is preferably 5% by weight or more, more preferably 10% by weight or more, and particularly preferably 20% by weight or more to provide a tensile elongation sufficient for practical use. The polyorganosiloxane units (B) content of the polyphenylene sulfide block copolymer was calculated by multiplying the molar fraction of Si atoms determined by elemental analysis by the molecular weight of the organosiloxane repeating units.

In the polyphenylene sulfide block copolymer, the polyphenylene sulfide units (A), represented by general formula (V) above, and the polyorganosiloxane units (B), represented by general formula (VI) above, may be bonded via a structure other than the repeating units of these blocks or, alternatively, may be bonded directly via end structures deriving from these repeating units. Furthermore, the same repeating units may be bonded to each other.

The glass-transition temperature of the polyphenylene sulfide block copolymer must be 80° C. or lower to provide flexibility and toughness and is preferably 60° C. or lower to provide even higher flexibility and toughness. Although there is no lower limit to the glass-transition temperature, it is preferably not lower than 50° C. to retain inherent properties of polyphenylene sulfides, and the glass-transition temperature may also be, for example, not lower than 30° C. to provide even higher flexibility and toughness. The glass-transition temperature can be defined as an inflection point of a baseline shift observed when the temperature is raised from 0° C. to 340° C. at a rate of 20° C./min by differential scanning calorimetry.

The weight-average molecular weight of the polyphenylene sulfide block copolymer must be 35,000 or more, preferably 40,000 or more, and particularly preferably 45,000 or more to provide flexibility and toughness more suitable for practical use. The upper limit of the weight-average molecular weight must be 100,000 or less, preferably 90,000 or less, and particularly preferably 80,000 or less in terms of moldability. A polyphenylene sulfide block copolymer having a weight-average molecular weight of less than 35,000 tends to have reduced toughness, whereas a polyphenylene sulfide block copolymer having a weight-average molecular weight of more than 100,000 has a high melt viscosity that leads to poor moldability.

The polyphenylene sulfide block copolymer preferably has a monomodal molecular weight distribution. When the polyphenylene sulfide block copolymer has a monomodal molecular weight distribution, the polyphenylene sulfide units (A), represented by general formula (V) above, and the polyorganosiloxane units (B), represented by general formula (VI) above, are sufficiently block copolymerized, leading to a sufficient modification effect. The molecular weight distribution of the polyphenylene sulfide block copolymer is also used as a polydispersity index, indicating how sufficiently the block copolymerization has proceeded. The polydispersity index (weight-average molecular weight (Mw)/number-average molecular weight (Mn)) is preferably 6.0 or less, and to prevent the decrease in toughness due to low-molecular-weight components, the polydispersity index (weight-average molecular weight (Mw)/number-average molecular weight (Mn)) is more preferably 5.0 or less. The weight-average molecular weight and the molecular weight distribution were determined by gel permeation chromatography (GPC) in terms of polystyrene.

The lower limit of the melting point of the polyphenylene sulfide block copolymer is preferably not lower than 260° C., more preferably not lower than 265° C. To provide even higher flexibility and toughness, the lower limit may also be, for example, not lower than 240° C. The upper limit of the melting point of the polyphenylene sulfide block copolymer is preferably not higher than 290° C. A melting point of the polyphenylene sulfide block copolymer in this preferred range increases the likelihood that properties derived from the polyphenylene sulfide units (A) such as heat resistance and chemical resistance, are expressed and is also sufficient for providing high flexibility and high toughness. The melting point can be defined as a melting peak temperature observed when the temperature is raised from 0° C. to 340° C. at a rate of 20° C./min, held at 340° C. for 1 minute, lowered to 100° C. at a rate of 20° C./min, held at 100° C. for 1 minute, and then raised to 340° C. at a rate of 20° C./min by differential scanning calorimetry.

(2) (A) Polyphenylene Sulfide

The polyphenylene sulfide (A), used to synthesize the block copolymer, may be any polyphenylene sulfide that can provide a polyphenylene sulfide block copolymer by being heated with the polyorganosiloxane (B). Particularly preferred is a linear homopolymer composed mainly of repeating structural units —(Ph-S)—.

Furthermore, the polyphenylene sulfide (A) preferably has a reactive functional group such as those in general formula (I):

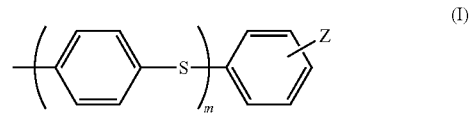

wherein Z is a reactive functional group selected from a carboxyl group, an amino group, a hydroxyl group, an acid anhydride group, an isocyanate group, an epoxy group, a silanol group, an alkoxysilane group, and derivatives thereof. Preferred is a structure having such a reactive functional group at an end, and particularly preferred is a structure having a reactive functional group selected from a carboxyl group, an amino group, and an isocyanate group at an end. m is an integer of 10 or greater. The upper limit of m is, for example, 200 or less, preferably 120 or less, and particularly preferably 80 or less to increase the weight fraction of polyorganosiloxane in the polyphenylene sulfide block copolymer to thereby achieve a sufficient modification.

Such a reactive functional group at an end of the polyphenylene sulfide (A) further facilitates the block copolymerization with the polyorganosiloxane (B) having functional groups. The weight-average molecular weight of the polyphenylene sulfide (A) subjected to block copolymerization is preferably 1,000 or more, more preferably 3,000 or more. Polyphenylene sulfide (A) having a weight-average molecular weight of 1,000 or more prevents the reduction in heat resistance, chemical resistance, and other properties of the resulting polyphenylene sulfide block copolymer. The upper limit of the weight-average molecular weight of the polyphenylene sulfide (A) is preferably 80,000 or less, more preferably 60,000 or less to not reduce the reactivity with the polyorganosiloxane (B). The weight-average molecular weight was determined by gel permeation chromatography (GPC) in terms of polystyrene.

The functional group content of the polyphenylene sulfide (A) is preferably 100 µmol/g or more, more preferably 200 µmol/g or more, and particularly preferably 300 µmol/g or more so that the reaction with the polyorganosiloxane (B) proceeds sufficiently to produce a high modification effect. When the functional group content of the polyphenylene sulfide (A) is 100 µmol/g or more, block copolymerization proceeds sufficiently to produce a sufficient modification effect. The upper limit of the functional group content of the polyphenylene sulfide (A) is preferably 3,000 µmol/g or less, particularly preferably 2,500 µmol/g or less, because the weight-average molecular weight of the polyphenylene sulfide (A) decreases correlatively with increasing functional group content.

Such preferred polyphenylene sulfide (A) can be produced, for example, by Method (A1), which includes heating a mixture containing at least a sulfidizing agent, a dihalogenated aromatic compound, an organic polar solvent, and a monohalogenated compound having a reactive functional group; Method (A2), which includes heating cyclic polyphenylene sulfide (a) in the presence of a sulfide compound having reactive functional groups; and Method (A3), which includes thermally reacting a mixture containing at least polyphenylene sulfide, an organic polar solvent, and a sulfidizing agent, adding a monohalogenated compound having a reactive functional group to the resulting reaction mixture, and heating the resulting mixture.

Before making a detailed description of a method of producing the polyphenylene sulfide (A) used to synthesize the block copolymer, a description will be given of materials used for the production.

Sulfidizing Agent

The sulfidizing agent used to synthesize the polyphenylene sulfide (A) may be any agent capable of introducing sulfide bonds into a dihalogenated aromatic compound, and examples include alkali metal sulfides, alkali metal hydrosulfides, and hydrogen sulfide.

Specific examples of alkali metal sulfides include lithium sulfide, sodium sulfide, potassium sulfide, rubidium sulfide, cesium sulfide, and mixtures of two or more thereof. Of these, lithium sulfide and/or sodium sulfide are preferred, and sodium sulfide is more preferred. Any of these alkali metal sulfides can be used in the form of a hydrate, an aqueous mixture, or an anhydride. The term "aqueous mixture" refers to an aqueous solution, a mixture of an aqueous solution and a solid component, or a mixture of water and a solid component. Commonly available, inexpensive alkali metal sulfides are hydrates or aqueous mixtures, and thus, alkali metal sulfides in such a form are suitable for use.

Specific examples of alkali metal hydrosulfides include lithium hydrosulfide, sodium hydrosulfide, potassium hydrosulfide, rubidium hydrosulfide, cesium hydrosulfide, and mixtures of two or more thereof. Of these, lithium hydrosulfide and/or sodium hydrosulfide are preferred, and sodium hydrosulfide is more preferred.

Alkali metal sulfides produced in the reaction system of an alkali metal hydrosulfide and an alkali metal hydroxide can also be used. In addition, alkali metal sulfides produced by contacting an alkali metal hydrosulfide with an alkali metal hydroxide in advance can also be used. Any of these alkali metal hydrosulfides and alkali metal hydroxides can be used in the form of a hydrate, an aqueous mixture, or an anhydride, and is preferably used in the form of a hydrate or an aqueous mixture in terms of availability and cost.

Furthermore, alkali metal sulfides produced in the reaction system of an alkali metal hydroxide such as lithium hydroxide or sodium hydroxide and hydrogen sulfide can also be used. In addition, alkali metal sulfides produced by contacting an alkali metal hydroxide such as lithium hydroxide or sodium hydroxide with hydrogen sulfide in advance can also be used. Hydrogen sulfide may be used in the gaseous state, liquid state, or aqueous solution state.

Alkali metal hydroxides and/or alkaline earth metal hydroxides can be used in combination with the sulfidizing agent. Specific examples of suitable alkali metal hydroxides include sodium hydroxide, potassium hydroxide, lithium hydroxide, rubidium hydroxide, cesium hydroxide, and mixtures of two or more thereof. Specific examples of alkaline earth metal hydroxides include calcium hydroxide, strontium hydroxide, and barium hydroxide. Of these, sodium hydroxide is suitable for use.

When an alkali metal hydrosulfide is used as the sulfidizing agent, it is particularly preferable to simultaneously use an alkali metal hydroxide, the amount of which is preferably 0.95 mole or more, more preferably 1.00 mole or more, and still more preferably 1.005 moles or more, per mole of alkali metal hydrosulfide. The upper limit of the range is preferably 1.50 moles or less, more preferably 1.25 moles or less, and still more preferably 1.200 moles or less. When hydrogen sulfide is used as the sulfidizing agent, it is particularly preferable to simultaneously use an alkali metal hydroxide. The amount of alkali metal hydroxide in this case is preferably 2.00 moles or more, more preferably 2.01 or more, and still more preferably 2.04 moles or more, per mole of hydrogen sulfide. The upper limit of the range is preferably 3.00 moles or less, more preferably 2.50 moles or less, and still more preferably 2.40 moles or less.

Dihalogenated Aromatic Compound

Examples of dihalogenated aromatic compounds used to synthesize the polyphenylene sulfide (A) include dihalogenated benzenes such as p-dichlorobenzene, o-dichlorobenzene, m-dichlorobenzene, p-dibromobenzene, o-dibromobenzene, m-dibromobenzene, 1-bromo-4-chlorobenzene, and 1-bromo-3-chlorobenzene; and dihalogenated aromatic compounds containing substituents other than halogens such as 1-methoxy-2,5-dichlorobenzene, 1-methyl-2,5-dichlorobenzene, 1,4-dimethyl-2,5-dichlorobenzene, 1,3-dimethyl-2,5-dichlorobenzene, and 3,5-dichlorobenzoic acid. In particular, halogenated aromatic compounds composed mainly of p-dihalogenated benzenes such as p-dichlorobenzene are preferred. Particularly preferred are those containing p-dichlorobenzene in an amount of 80 to 100 mol %, more preferably 90 to 100 mol %. Two or more different dihalogenated aromatic compounds may be used in combination.

Organic Polar Solvent

Examples of preferred organic polar solvents used to synthesize the polyphenylene sulfide (A) include organic amide solvents. Specific examples include aprotic organic solvents including N-alkyl pyrrolidones such as N-methyl-2-pyrrolidone, N-ethyl-2-pyrrolidone, and N-cyclohexyl-2-pyrrolidone, caprolactams such as N-methyl-ε-caprolactam, 1,3-dimethyl-2-imidazolidinone, N,N-dimethylacetamide, N,N-dimethylformamide, hexamethylphosphoric triamide, and mixtures thereof. These are suitable for use for their high reaction stabilities. Of these, N-methyl-2-pyrrolidone and 1,3-dimethyl-2-imidazolidinone are preferred, and N-methyl-2-pyrrolidone is more preferred.

Monohalogenated Compound

The monohalogenated compound used to synthesize the polyphenylene sulfide (A) may be any monohalogenated compound having a reactive functional group W, represented by general formula (II) below. Preferred are those having a reactive functional group W selected from a carboxyl group, an amino group, a hydroxyl group, an acid anhydride group, an isocyanate group, an epoxy group, a silanol group, an alkoxysilane group, and derivatives thereof. Of these, those having a carboxyl group, an amino group, or an isocyanate group as a functional group are more preferred, and a carboxyl group is particularly preferred. These functional groups tend to be efficiently introduced into the polyphenylene sulfide (A).

(II)

wherein V represents a halogen.

Specific examples of such monohalogenated compounds include monohalogenated compounds such as 2-chlorobenzoic acid, 3-chlorobenzoic acid, 4-chlorobenzoic acid, 2-amino-4-chlorobenzoic acid, 4-chloro-3-nitrobenzoic acid, 4'-chlorobenzophenone-2-carboxylic acid, 2-chloroaniline, 3-chloroaniline, 4-chloroaniline, 2-chlorophenol, 3-chlorophenol, and 4-chlorophenol. Of these, 4-chlorobenzoic acid is more preferred in terms of polymerization reactivity, versatility, and other properties. These monohalogenated compounds may be used alone or in a combination of two or more.

Cyclic Polyarylene Sulfide (a)

The cyclic polyphenylene sulfide (a), used to synthesize the polyphenylene sulfide (A), is a monomer or mixture of a cyclic compound composed mainly, preferably 80 mol % or more, of repeating structural units —(Ph-S)— as represented by general formula (IV) below, and the cyclic compound of formula (IV) is preferably contained in an amount of 50% by weight or more, more preferably 70% by weight or more, still more preferably 80% by weight or more, and particularly preferably 90% by weight or more.

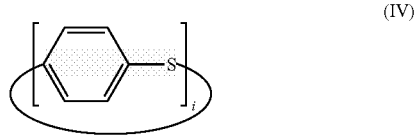

(IV)

The cyclic polyphenylene sulfide (a) may contain cyclic polyphenylene sulfide in any amount, but its upper limit is preferably 98% by weight or less, more preferably 95% by weight or less. In general, as the weight fraction of cyclic polyphenylene sulfide in the cyclic polyphenylene sulfide (a) increases, polyphenylene sulfides obtained after heating tend to have a higher molecular weight. When the weight fraction of cyclic polyphenylene sulfide in the cyclic polyphenylene sulfide (a) is in the above preferred range, an excessive increase in melting temperature cannot occur.

The number of cycles i in general formula (IV) is preferably, but not necessarily, from 4 to 50, more preferably from 4 to 25, and still more preferably from 4 to 15. As described below, conversion of the cyclic polyphenylene sulfide (a) into polyphenylene sulfide by heating is preferably carried out at or above the temperature at which the cyclic polyphenylene sulfide (a) melts, but the melting temperature of the cyclic polyphenylene sulfide (a) tends to increase as the number of cycles i increases. Thus, to enable the conversion of the cyclic polyphenylene sulfide (a) into the polyphenylene sulfide (A) to be carried out at lower temperatures, it is advantageous that the number of cycles i should be in the above range.

Furthermore, the cyclic polyphenylene sulfide (a) may be either a single compound having a single number of cycles or a mixture of cyclic compounds having different numbers of cycles. However, a mixture of cyclic compounds having different numbers of cycles tends to have a lower melting temperature than a single compound having a single number of cycles, and using a mixture of cyclic compounds having different numbers of cycles is preferred because the temperature during the conversion into polyphenylene sulfide can be lower.

The component other than the cyclic polyphenylene sulfide (a) in the cyclic polyphenylene sulfide (a) is preferably a polyphenylene sulfide oligomer. As used herein, the term "polyphenylene sulfide oligomer" refers to a linear homooligomer or cooligomer composed mainly, preferably 80 mol % or more, of repeating structural units —(Ph-S)—. The molecular weight of the polyphenylene sulfide oligomer may be, for example, lower than that of polyphenylene sulfide. Specifically, a number average molecular weight of less than 5,000 is preferred.

Sulfide Compound

The sulfide compound used to synthesize the polyphenylene sulfide (A) is a sulfide compound having reactive functional groups, represented by general formula (III) below:

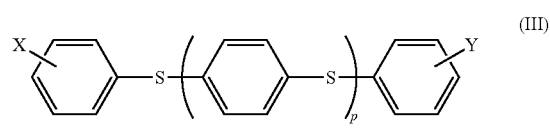

(III)

wherein at least one of X and Y is a reactive functional group selected from an amino group, a carboxyl group, a hydroxyl group, an acid anhydride group, an isocyanate group, an epoxy group, a silanol group, an alkoxysilane group, and derivatives thereof, preferably a reactive functional group selected from an amino group, a carboxyl group, and a hydroxyl group.

The number of cycles p in the sulfide compound is an integer of 0 to 20, and p may be a single integer or a combination of different integers. Preferably, p is an integer of 0 to 15, more preferably 0 to 10. When the number of cycles p is in this preferred range, decreases in compatibility with cyclic polyphenylene sulfide and low-viscosity properties cannot occur.

Specific examples of such sulfide compounds include bis(2-aminophenyl) sulfide, bis(3-aminophenyl) sulfide, bis(4-aminophenyl) sulfide, bis(2-carboxyphenyl) sulfide, bis(3-carboxyphenyl) sulfide, bis(4-carboxyphenyl) sulfide, bis(2-hydroxyphenyl) sulfide, bis(3-hydroxyphenyl) sulfide, bis(4-hydroxyphenyl) sulfide, bis(4-hydroxy-3-methylphenyl) sulfide, 5,5'-thiodisalicylic acid, 2,2',4,4'-tetrahydroxydiphenyl sulfide, and oligomers thereof. Of these, bis(4-aminophenyl) sulfide, bis(4-carboxyphenyl) sulfide, bis(4-hydroxyphenyl) sulfide, and oligomers thereof are more suitable for use in terms of reactivity and crystallinity. These sulfide compounds may be used alone or as a mixture or a combination of two or more.

A detailed description will now be given of preferred methods of producing the polyphenylene sulfide (A).

(3) Methods of Producing Polyphenylene Sulfide (A)

Method of Producing Polyphenylene Sulfide (A): A1

A first preferred method of producing the polyphenylene sulfide (A) is a method including heating a mixture containing at least a sulfidizing agent, a dihalogenated aromatic compound, an organic polar solvent, and a monohalogenated compound having a reactive functional group.

To inhibit decomposition and efficiently produce a polyphenylene sulfide having a viscosity suitable for processing, the amount of dihalogenated aromatic compound in this production method is preferably 0.80 mole or more, more preferably 0.90 mole or more, and still more preferably 0.95 mole or more, per mole of sulfidizing agent. The upper limit of the range is preferably less than 1.50 moles, more preferably less than 1.10 moles, and still more preferably less than 1.05 moles. A dihalogenated aromatic compound in an amount of 0.80 mole or more per mole of sulfidizing agent is unlikely to cause decomposition, whereas a dihalogenated aromatic compound in an amount of less than 1.50 moles prevents a reduction in molecular weight to ensure that mechanical properties are expressed.

In this production method, the amount of organic polar solvent used as a polymerization solvent for the polyphenylene sulfide (A) is not limited to any particular amount, but in terms of stable reactivity and economic efficiency, it is preferably 2.5 moles or more per mole of sulfidizing agent, and the upper limit of the range is preferably less than 5.5 moles, more preferably less than 5.0 moles, and still more preferably less than 4.5 moles.

Furthermore, in this production method, in which a monohalogenated compound having a reactive functional group is added together with a dihalogenated aromatic compound, the amount of monohalogenated compound is preferably 0.01 mol % or more per mole of dihalogenated aromatic compound. The upper limit of the range is preferably 25 mol % or less, more preferably 18 mol % or less, and still more preferably 15 mol %. A monohalogenated compound in an amount of 0.01 mol % or more provides a polyphenylene sulfide (A) with a reactive end sufficiently introduced, whereas a monohalogenated compound in an amount of 25 mol % or less avoids disadvantages such as reduction in molecular weight of the polyphenylene sulfide (A) and increase in material cost.

In addition, the total amount of halogenated compounds including the dihalogenated aromatic compound and the monohalogenated compound is preferably in a specific range. The total amount of halogenated compounds is preferably 0.98 mole or more, more preferably 1.00 mole or more, and still more preferably 1.03 moles or more, per mole of sulfidizing agent. The upper limit of the total amount of halogenated compounds is preferably less than 1.10 moles, more preferably less than 1.08 moles, and still more preferably less than 1.07 moles, per mole of sulfidizing agent. Halogenated compounds in a total amount of 0.98 mole or more per mole of sulfidizing agent are unlikely to cause decomposition, whereas halogenated compounds in a total amount of less than 1.10 moles prevents the reduction in molecular weight to ensure that mechanical properties are expressed.

When the polyphenylene sulfide (A) is produced by this production method, the monohalogenated compound may be added at any timing, for example, during the dehydration step described below, at the start of polymerization, or during polymerization. Also, the monohalogenated compound may be added in several times. The monohalogenated compound is preferably added when the conversion of the dihalogenated aromatic compound is less than 80%, more preferably less than 70%, and most preferably from the end of the dehydration step to the start of polymerization or at the start of polymerization, that is, together with the dihalogenated aromatic compound. Adding the monohalogenated compound at such a preferred timing eliminates the need for a reflux apparatus, which is to prevent the monohalogenated compound from vaporizing, and an injection apparatus and ensures that the monohalogenated compound is completely consumed and does not remain in the polymerization system at the end of the polymerization.

Furthermore, the sulfidizing agent can be used in the form of a hydrate or an aqueous mixture. In this case, before adding a dihalogenated aromatic compound and a monohalogenated compound, it is preferable to perform the dehydration step where the mixture of an organic polar solvent and the sulfidizing agent is heated to remove an excess amount of water from the system. The dehydration is preferably, but not necessarily, carried out such that an alkali metal hydrosulfide and an alkali metal hydroxide are added to the organic polar solvent in an inert gas atmosphere at a temperature ranging from normal temperature to 150° C., preferably from normal temperature to 100° C., and the temperature is raised under normal or reduced pressure to at least 150° C., preferably 180 to 260° C., to evaporate water. The amount of water in the system at the end of the dehydration step is preferably 0.9 to 1.1 moles per mole of the sulfidizing agent loaded. The amount of water in the system herein refers to a value calculated by subtracting the amount of water removed from the system from the amount of water loaded in the dehydration step.

In the method of producing the polyphenylene sulfide (A), a polymerization step is performed where the reaction product prepared in the above-described dehydration step is brought into contact with a dihalogenated aromatic compound and a monohalogenated compound in an organic polar solvent and allowed to polymerize. At the start of the polymerization step, a sulfidizing agent and a dihalogenated aromatic compound are added to the organic polar solvent preferably in an inert gas atmosphere at a temperature range of 100° C. or higher, preferably 130° C. or higher, and 220° C. or lower, preferably 200° C. or lower. These materials may be loaded in random order or at the same time.

The polymerization reaction is performed at a temperature ranging from 200° C. to lower than 280° C., and it may be carried out by any polymerization method that produces the desired effects. Examples include a method in which the temperature is raised at a constant rate, and then the reaction is continued at 245° C. to lower than 280° C. for a given time; a method in which the reaction is carried out for a given time at a constant temperature of from 200° C. to lower than 245° C., and then the reaction is continued for a given time at an increased temperature of 245° C. to lower than 280° C.; and a method in which the reaction is carried out for a given time at a constant temperature of from 200° C. to lower than 245° C., particularly, 230° C. to lower than 245° C., and then the temperature is raised to 245° C. to lower than 280° C. to complete the reaction in a short time.

The polymerization reaction is carried out desirably in a non-oxidizing atmosphere, preferably in an inert gas atmosphere such as nitrogen, helium, or argon, and particularly preferably in a nitrogen atmosphere in terms of economic efficiency and ease of handling. The reaction pressure in the polymerization reaction is not limited to any particular value because it varies depending on the type and amount of material and solvent used, the polymerization reaction temperature, and other conditions.

In the method of producing the polyphenylene sulfide block copolymer, the polyphenylene sulfide (A) is recovered from the polymerization reaction product obtained by the above method and used for a blocking reaction. The polymerization reaction product contains the polyphenylene sulfide (A) and an organic polar solvent and may also contain unreacted materials, water, by-product salts, and other components. From such a reaction mixture, the polyphenylene sulfide (A) can be recovered by any method, for example, a method in which some or most of the organic polar solvent is removed as required by distillation or any other operation, and then the mixture is brought into contact, optionally under heating, with a solvent that poorly dissolves the polyphenylene sulfide (A) component, is miscible with the organic polar solvent, and dissolves by-product salts to recover the polyphenylene sulfide (A) as a solid. Solvents having such properties typically have relatively high polarities, and the most suitable solvent cannot be determined because it varies depending on the type of the organic polar solvent used and the by-product salt. Examples include water; alcohols such as methanol, ethanol, propanol, isopropanol, butanol, and hexanol; ketones such as acetone and methyl ethyl ketone; and acetates such as ethyl acetate and butyl acetate. In terms of availability and economic efficiency, water, methanol, and acetone are preferred, and water is particularly preferred.

Treatment with such a solvent can reduce the amount of organic polar solvent and by-product salt in the polyphenylene sulfide (A). This treatment precipitates the polyphenylene sulfide (A) as a solid, which can be recovered using a known solid-liquid separation method. Solid-liquid separation can be carried out, for example, by separation by filtration, centrifugation, and decantation. This series of treatments may optionally be repeated several times. The repeated treatment tends to further reduce the amount of organic polar solvent and by-product salt in the polyphenylene sulfide (A).

The treatment with a solvent can also be carried out by mixing the polymerization reaction product with a solvent, and the mixture may optionally be stirred or heated as appropriate. The treatment with a solvent is carried out preferably, but not necessarily, at 20° C. to 220° C., more preferably 50° C. to 200° C. A temperature within this range is preferred because, for example, it facilitates the removal of by-product salts and also enables treatment under relatively low pressure. When water is used as a solvent, the water is preferably distilled water or deionized water. Alternatively, aqueous solutions may optionally be used that contain organic acid compounds such as formic acid, acetic acid, propionic acid, butyric acid, chloroacetic acid, dichloroacetic acid, acrylic acid, crotonic acid, benzoic acid, salicylic acid, oxalic acid, malonic acid, succinic acid, phthalic acid, and fumaric acid, and alkali metal salts and alkaline earth metal salts thereof; inorganic acid compounds such as sulfuric acid, phosphoric acid, hydrochloric acid, carbonic acid, and silicic acid; ammonium ions; and other compounds. The polyphenylene sulfide (A) that has been treated, when containing the solvent used for the treatment, may optionally be dried to remove the solvent.

Method of Producing Polyphenylene Sulfide (A): A2

A second preferred method of producing the polyphenylene sulfide (A) is a method including heating a cyclic polyphenylene sulfide (a) in the presence of a sulfide compound (III) having a reactive functional group. This method readily provides the polyphenylene sulfide (A) having the above-described properties.

In the method (A2) of producing the polyphenylene sulfide (A), the amount of sulfide compound (III) is preferably 0.01 mol % or more per mole of phenylene sulfide structural units of the cyclic polyphenylene sulfide (a). The upper limit of the range is preferably 25 mol % or less, more preferably 15 mol % or less, still more preferably 10 mol % or less, and particularly preferably 5 mol % or less. A sulfide compound in an amount of 0.01 mol % or more provides a polyphenylene sulfide (A) with reactive functional groups sufficiently introduced. A sulfide compound in an amount of 25 mol % or less avoids disadvantages such as reduction in molecular weight of the resulting polyphenylene sulfide (A) and increase in material cost.

The heating temperature in producing the polyphenylene sulfide (A) by the production method (A2) is preferably a temperature at which a reaction mixture of the cyclic polyphenylene sulfide (a) and the sulfide compound (III) having reactive functional groups melts, and there are no particular limitations as long as such temperature conditions are satisfied. A heating temperature equal to or higher than the melting temperature of the cyclic polyphenylene sulfide (a) is preferred because an excessively long time will not be required to produce the polyphenylene sulfide (A). The temperature at which the cyclic polyphenylene sulfide (a) melts, although varying depending on the composition and molecular weight of the cyclic polyphenylene sulfide (a) and the environment during heating, can be estimated, for example, by analyzing the cyclic polyphenylene sulfide (a) by differential scanning calorimetry. The lower limit of the heating temperature is, for example, 180° C. or higher, preferably 200° C. or higher, more preferably 220° C. or higher, and still more preferably 240° C. or higher. In this temperature range, the cyclic polyphenylene sulfide (a) melts, and the polyphenylene sulfide (A) can be produced in a short time. The upper limit of the heating temperature is, for example, 400° C. or lower, preferably 360° C. or lower, and more preferably 340° C. or lower. At or below these temperatures, adverse effects of the undesirable side reactions on the properties of the resulting polyphenylene sulfide (A) tend to be reduced, and the polyphenylene sulfide (A) having the properties described above can be produced.

The reaction time, although varying depending on the various properties such as the content, the number of cycles (i), and the molecular weight, of cyclic compounds in the cyclic polyphenylene sulfide (a) used, the type of sulfide compound used, and the conditions such as heating temperature, is preferably set to prevent the above undesirable side reactions. The heating time is, for example, 0.01 hour or longer, preferably 0.05 hour or longer. The upper limit is, for example, 100 hours or shorter, preferably 20 hours or shorter, and more preferably 10 hours or shorter.

The heating of the cyclic polyphenylene sulfide (a) can also be carried out under substantially solvent-free conditions. Under such conditions, the temperature can be raised in a short time, and the reaction proceeds fast, as a result of which the polyphenylene sulfide (A) tends to be produced in a short time. As used herein, the term "substantially solvent-free conditions" means that the amount of solvent in the cyclic polyphenylene sulfide (a) is 10% by weight or less, more preferably 3% by weight or less.

The heating may, as a matter of course, be carried out using a commonly used polymerization reactor and may further be carried out using any apparatus equipped with a heating mechanism such as molds for producing molded articles, extruders, and melt kneaders and known systems such as a batch method and a continuous method can be employed.

Heating the cyclic polyphenylene sulfide (a) is preferably carried out in a non-oxidizing atmosphere, and reduced pressure conditions are also preferred. When heating is carried out under reduced pressure conditions, it is preferable to bring the atmosphere in the reaction system once under a non-oxidizing atmosphere before establishing reduced pressure conditions. This operation tends to reduce the occurrence of undesirable side reactions such as decomposition reactions and cross-linking reactions, for example, between cyclic polyphenylene sulfides, between polyphenylene sulfides produced by heating, and between polyphenylene sulfide and cyclic polyphenylene sulfide. The term "non-oxidizing atmosphere" refers to an atmosphere in which the gas phase with which cyclic polyphenylene sulfide comes into contact has an oxygen concentration of 5% by volume or less, preferably 2% by volume or less, and more preferably is substantially free of oxygen, i.e., an inert gas atmosphere such as nitrogen, helium, or argon. Of these, the nitrogen atmosphere is particularly preferred in terms of economic efficiency and ease of handling. "Under reduced pressure conditions" means that the pressure in the reaction system is lower than atmospheric pressure, and the upper limit is preferably 50 kPa or lower, more preferably 20 kPa or lower, and still more preferably 10 kPa or lower. The lower limit is, for example, 0.1 kPa or higher, more preferably 0.2 kPa or higher. Under reduced pressure conditions not lower than the preferred lower limit, low-molecular-weight cyclic compounds in the cyclic polyphenylene sulfide are unlikely to vaporize, whereas under reduced pressure conditions not higher than the preferred upper limit, undesirable side reactions such as cross-linking reactions are less likely to occur, as a result of which the polyphenylene sulfide (A) having the properties described above can be produced. Heating the cyclic polyphenylene sulfide (a) can also be carried out under pressurized conditions. When the heating is carried out under pressurized conditions, it is preferable to bring the atmosphere in the reaction system once under a non-oxidizing atmosphere before establishing pressurized pressure conditions. The term "under pressurized conditions" means that the pressure in the reaction system is higher than atmospheric pressure. The upper limit is preferably, but not necessarily, not higher than 0.2 MPa in terms of ease of handling of reactors.

Method of Producing Polyphenylene Sulfide (A): A3

A third preferred method of producing the polyphenylene sulfide (A) is a method including performing Reaction (A3-1) by heating a mixture containing at least polyphenylene sulfide, an organic polar solvent, and a sulfidizing agent, and performing Reaction (A3-2) by adding a monohalogenated compound having a reactive functional group to the resulting reaction mixture. Reaction (A3-1) and Reaction (A3-2) will be described below in detail.

Reaction (A3-1)

In Reaction (A3-1), a mixture containing at least polyphenylene sulfide, an organic polar solvent, and a sulfide compound is heated and reacted.

The amount of polyphenylene sulfide used in Reaction (A3-1) is not limited as long as the polyphenylene sulfide is contained in the reaction mixture at the start of reaction, but the amount of sulfidizing agent is preferably less than 2 mol %, more preferably less than 1 mol %, per mole of the repeating units represented by general formula (VII), the main structural unit of the polyphenylene sulfide. The lower limit of the amount of sulfidizing agent based on the amount of polyphenylene sulfide is preferably 0.01 mol % or more, more preferably 0.1 mol % or more.

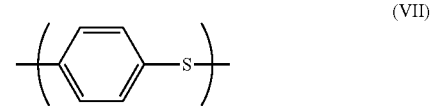

(VII)

A polyphenylene sulfide and a sulfidizing agent in amounts in this preferred range provides advantages in that degradation of the physical properties of the resulting polyphenylene sulfide (A) due to having a low molecular weight tends to be reduced, and reactive functional groups are introduced into the polyphenylene sulfide (A) with high efficiency.

The amount of organic polar solvent for use in Reaction (A3-1) is not limited, but is preferably 2.5 moles or more per mole of sulfur atoms contained in the reaction in the reaction mixture in terms of stable reactivity and economic efficiency. The upper limit of the range is preferably less than 50.0 moles, more preferably less than 10.0 moles, and still more preferably less than 5.5 moles.

In Reaction (A3-1) in which a mixture containing at least polyphenylene sulfide, an organic polar solvent, and a sulfidizing agent is heated and reacted, the reaction temperature, although varying depending on the types and amounts of polyphenylene sulfide, organic polar solvent, and sulfidizing agent used in the reaction, is preferably 120° C. or higher, more preferably 150° C. or higher, and still more preferably 200° C. or higher. The upper limit of the range is preferably 280° C. or lower, more preferably 270° C. or lower, and still more preferably 250° C. or lower. Temperatures in this preferred range tend to result in a higher reaction rate. The reaction may be a single-step reaction at a constant temperature, a multistep reaction in which the temperature is increased stepwise, or a reaction in which the temperature is continuously changed.

The reaction time, although varying depending on the type and amount of materials used or the reaction temperature, is preferably at least 0.1 hour, more preferably at least 0.5 hour, and still more preferably at least 1 hour. A reaction of at least this preferred time tends to sufficiently reduce unreacted components. Although the reaction may be continued for any period of time, the reaction proceeds sufficiently within 40 hours. The reaction time may be within 10 hours and may also be within 6 hours.

When at least polyphenylene sulfide and a sulfidizing agent are heated and reacted in an organic polar solvent, components that substantially do not inhibit the reaction and components that promote the reaction can also be added in addition to the essential components. The reaction is preferably, but not necessarily, carried out under stirring. Furthermore, in Reaction (A3-1), known various polymerization methods and reaction methods such as a batch method and a continuous method can be employed. Reaction (A3-1) is desirably carried out in a non-oxidizing atmosphere, preferably in an inert atmosphere such as nitrogen, helium, or argon, and preferably in a nitrogen atmosphere in terms of economic efficiency and ease of handling.

Also, in Reaction (A3-1) described above, to prevent the decrease in reaction rate, it is preferable to perform the dehydration step for removing an excess amount of water from the system by the same method as noted in Section A1.

Reaction (A3-2)

In Reaction (A3-2), the reaction is carried out by adding a monohalogenated compound having a reactive functional group to the reaction mixture obtained in Reaction (A3-1).

The amount of monohalogenated compound added is not limited but is preferably 1.0 mole or more, more preferably 2.0 moles or more, and particularly preferably 2.5 moles or more, per mole of the sulfidizing agent used in Reaction (A3-1). The upper limit is preferably 10 moles or less, more preferably 5.0 moles or less, and particularly preferably 4.5 moles or less. A monohalogenated compound added in an amount in such a preferred range is preferred because reactive functional groups are introduced with high efficiency.

The preferred reaction temperature in Reaction (A3-2), although varying depending on the type and amount of components in the reaction mixture, the molecular weight of the polyphenylene sulfide in the reaction mixture obtained in Reaction (A3-1), and other factors, is preferably 120° C. or higher, more preferably 150° C. or higher, and still more preferably 200° C. or higher. The upper limit of the range is preferably 280° C. or lower, more preferably 270° C. or lower, and still more preferably 250° C. or lower. Temperatures in this preferred range tend to result in a higher reaction rate. The reaction may be a single-step reaction at a constant temperature, a multistep reaction in which the temperature is increased stepwise, or a reaction in which the temperature is continuously changed.

The reaction time in Reaction (A3-2), although varying depending on the molecular weight of the polyphenylene sulfide in the reaction mixture obtained in Reaction (A3-1), the type and amount of other components in the reaction mixture, and the reaction temperature, is, for example, at least 0.05 hour, preferably at least 0.1 hour, more preferably at least 0.5 hour, and still more preferably at least 1 hour. Although the reaction may be continued for any period of time, the reaction proceeds sufficiently within 10 hours. The reaction time may be within 6 hours and may also be within 3 hours.

In the method of producing the block copolymer, the polyphenylene sulfide (A) is recovered from the reaction mixture thus obtained and used for blocking reaction, and the polyphenylene sulfide (A) can be recovered by the same method as noted in Section A1.

(4) Polyorganosiloxane (B)

The polyorganosiloxane (B) may be any polyorganosiloxane that reacts with the polyphenylene sulfide (A) with high efficiency. For block copolymerization to proceed efficiently, the polyorganosiloxane (B) preferably has a reactive functional group. A non-limiting example is polyorganosiloxane represented by general formula (VIII) below:

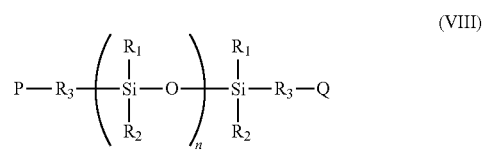

wherein P and Q each represent an epoxy group, a glycidyl group, a carboxyl group, a hydroxyl group, an amino group, or a mercapto group, and the epoxy group and the glycidyl group are preferred in terms of reactivity of the functional group. These functional groups may be bonded to one end and a side chain of the polyorganosiloxane but are preferably bonded to both ends to promote block copolymerization that leads to efficient modification. $R^1$, $R^2$, and $R^3$ each represent a C1 to C10 alkyl group or a C6 to C10 aromatic group. Specifically, for example, $R^1$ and $R^2$ each represent an alkyl group such as methyl, ethyl, or propyl, or an aromatic group such as phenyl or naphthyl. In terms of availability, $R^1$ and $R^2$ are preferably methyl or phenyl, and they may be the same or different. $R^3$ is, for example, an alkyl group such as methyl, ethyl, or propyl, or an aromatic group such as phenyl or naphthyl, and in terms of availability, methyl, ethyl, or propyl is preferred. n is, for example, 1 or greater, preferably 5 or greater, and particularly preferably 10 or greater. The upper limit of n is, for example, 100 or less, preferably 60 or less, and particularly preferably 40 or less in terms of compatibility with polyphenylene sulfide and organic polar solvent. The functional group content of the polyorganosiloxane (B) having functional groups, although varying depending on the combination with the functional group in the polyphenylene sulfide (A), is preferably 100 µmol/g or more. To increase the amount of copolymerization with the polyphenylene sulfide (A), the functional group content of the polyorganosiloxane (B) is more preferably 250 µmol/g or more, particularly preferably 400 µmol/g or more. When the functional group content of the polyorganosiloxane (B) having functional groups is 100 µmol/g or more, the amount of copolymerization of the polyorganosiloxane (B) is sufficient, leading to a sufficient modification effect. The upper limit of the functional group content of the polyorganosiloxane (B) is preferably, but not necessarily, 4,000 µmol/g or less, particularly preferably 3,000 µmol/g or less. Specific examples of such polyorganosiloxane (B) include KF-105, X-22-163A, X-22-163B, X-22-163C, KF-8010, X-22-161A, X-22-161B, KF-8012, X-22-169AS, X-22-169B, X-22-160AS, KF-6001, KF-6002, KF-6003, X-22-1821, X-22-164A, X-22-164B, X-22-164C, X-22-162C, X-22-167B, X-22-167C, X-22-173BX, X-22-173DX, X-22-170BX, X-22-170DX, X-22-176DX, and X-22-176GX-A, which are available from Shin-Etsu Chemical Co., Ltd.

(5) Method of Producing Polyphenylene Sulfide Block Copolymer

The polyphenylene sulfide block copolymer may be produced by any method that can produce a polyphenylene sulfide block copolymer having the characteristics described in Section (1). One particularly preferred method is to heat and react the polyphenylene sulfide (A), having a repeating structure represented by general formula (V), and the polyorganosiloxane (B), represented by general formula (VI).

It is more preferable to heat and react a mixture containing the polyphenylene sulfide (A), represented by general formula (I) and having a functional group content of 100 µmol/g or more, and the polyorganosiloxane (B), represented by general formula (VI) and having functional groups. Although the mixing ratio of the polyphenylene sulfide (A) to the polyorganosiloxane (B) varies depending on the molecular weight and the functional group content of the polyphenylene sulfide (A) used, the type and the molecular weight of the polyorganosiloxane (B), the reaction conditions, and other factors, the ratio of the functional group content of the polyorganosiloxane (B) to the functional group content of the polyphenylene sulfide (A) is preferably 0.5 or more, more preferably 1 or more, and particularly preferably 3 or more to facilitate block copolymerization to produce a polyphenylene sulfide block copolymer having a higher molecular weight. The upper limit of the ratio is preferably 15 or less, more preferably 9 or less, and most preferably 5 or less to facilitate block copolymerization to produce a polyphenylene sulfide block copolymer having a higher molecular weight. When the ratio of the functional group content of the polyorganosiloxane (B) to the functional group content of the polyphenylene sulfide (A) is 0.5 or more, copolymerization reaction is facilitated to produce a sufficient modification effect, whereas when the ratio is 15 or less, the increase in unreacted polyorganosiloxane is prevented, resulting in no complexity in a purification process and no increase in material cost. Furthermore, when the ratio of the functional group content of the polyorganosiloxane (B) to the functional group content of the polyphenylene sulfide (A) is in the above preferred range, there is no increase in the frequency of the reaction between polyorganosiloxanes, leading to expression of sufficient flexibility and toughness.

The thermal reaction of the polyphenylene sulfide (A) and the polyorganosiloxane (B) may be carried out, as required, by melt polymerization under solvent-free conditions or solution polymerization in an organic polar solvent. In the latter case, it is preferable to use an organic amide solvent. Specific examples include aprotic organic solvents including N-alkyl pyrrolidones such as N-methyl-2-pyrrolidone, N-ethyl-2-pyrrolidone, and N-cyclohexyl-2-pyrrolidone, caprolactams such as N-methyl-ε-caprolactam, 1,3-dimethyl-2-imidazolidinone, N,N-dimethylacetamide, N,N-dimethylformamide, hexamethylphosphoric triamide, and mixtures thereof. These are suitable for use for their high reaction stabilities. Of these, N-methyl-2-pyrrolidone and 1,3-dimethyl-2-imidazolidinone are preferred, and N-methyl-2-pyrrolidone is more preferred. The amount of organic polar solvent is preferably, but not necessarily, 0.1 mole or more per mole of structural units of the polyphenylene sulfide (A), and more preferably 0.5 mole or more to sufficiently dissolve the polyphenylene sulfide (A) and the polyorganosiloxane (B) to achieve high reactivity. The upper limit is preferably 5.0 moles or less, more preferably 3.0 moles or less from an economic point of view, and particularly preferably 2.0 moles or less to achieve a high concentration of the polyphenylene sulfide (A) and the polyorganosiloxane (B) in an organic polar solvent to promote the increase in molecular weight.

The above two reactions may be combined, for example, such that an organic polar solvent is added after melt polymerization and heated.

The temperature at which the mixture containing the polyphenylene sulfide (A) and the polyorganosiloxane (B) is heated and reacted, although varying depending on the molecular weight of the polyphenylene sulfide (A), the type and the molecular weight of the polyorganosiloxane (B), and other factors, is preferably higher than or equal to a temperature at which the polyphenylene sulfide (A) and the polyorganosiloxane (B) melt or dissolve in organic polar solvent, specifically, preferably 200° C. or higher, more preferably 230° C. or higher, and still more preferably 250° C. or higher. The upper limit of the reaction temperature is, for example, 400° C. or lower, preferably 380° C. or lower, and more preferably 350° C. or lower. Reaction temperatures at 200° C. or higher allow the reaction to proceed efficiently, leading to sufficient block co-polymerization, whereas reaction temperatures at 400° C. or lower prevent thermal decomposition of the polyphenylene sulfide (A) and the polyorganosiloxane (B). The reaction may be a single-step reaction at a constant temperature, a multistep reaction in which the temperature is increased stepwise, or a reaction in which the temperature is continuously changed.

When a polyphenylene sulfide block copolymer is produced by this production method, the polyorganosiloxane (B) may be added at any timing, for example, at the start of polymerization or during polymerization.

The time of the copolymerization reaction between the polyphenylene sulfide (A) and the polyorganosiloxane (B), although varying depending on the conditions such as structures and molecular weights of the polyphenylene sulfide (A) and the polyorganosiloxane (B) used in the reaction and reaction temperature, is, for example, 0.1 hour or longer, preferably 0.5 hour or longer, to improve productivity and allow the copolymerization reaction to proceed sufficiently. Although there is no upper limit to the reaction time, it is 10 hours or shorter in terms of productivity, preferably 8 hours or shorter, and more preferably 6 hours or shorter. For the polymerization atmosphere in the method of producing the polyphenylene sulfide block copolymer, reaction conditions generally employed in producing polyphenylene sulfide can be appropriately employed, for example, a reaction in an inert atmosphere such as nitrogen, helium, or argon, or a reaction under reduced pressure.

The polyphenylene sulfide block copolymer can be recovered by any method, for example, a method in which the reaction product is brought into contact, optionally under heating, with a solvent that poorly dissolves polyphenylene sulfide block copolymer components, but dissolves polyorganosiloxane to recover the polyphenylene sulfide block copolymer as a solid. Solvents having such properties typically have relatively low polarities, and the most suitable solvent cannot be determined because it varies depending on the type of polyorganosiloxane used. Examples include hydrocarbons such as hexane, heptane, and octane; aromatic hydrocarbons such as benzene, toluene, and xylene; and long-chain alcohols such as hexanol, heptanol, and octanol. In terms of availability and economic efficiency, hexane is preferred. To remove the organic polar solvent, a method may optionally be used in combination in which the reaction product is brought into contact, optionally under heating, with a solvent that poorly dissolves polyphenylene sulfide block copolymer components but is miscible with the organic polar solvent to recover the polyphenylene sulfide block copolymer as a solid. Solvents having such properties typically have relatively high polarities, and the most suitable solvent cannot be determined because it varies depending on the type of the organic polar solvent used. Examples include water; alcohols such as methanol, ethanol, propanol, isopropanol, butanol, and hexanol; ketones such as acetone and methyl ethyl ketone; and acetates such as ethyl acetate and butyl acetate. In terms of availability and economic efficiency, water, methanol, and acetone are preferred, and water is particularly preferred.

Treatment with such a solvent can reduce the amount of unreacted polyorganosiloxane and organic polar solvent in the polyphenylene sulfide block copolymer. This treatment precipitates the polyphenylene sulfide block copolymer as a solid, which can be recovered using a known solid-liquid separation method. Solid-liquid separation can be carried out, for example, by separation by filtration, centrifugation, and decantation. This series of treatments may optionally be repeated several times. The repeated treatment tends to further reduce the amount of unreacted polyorganosiloxane and organic polar solvent in the polyphenylene sulfide block copolymer.

A description will be given below of additives to the polyphenylene sulfide block copolymer.

Inorganic Filler

To the polyphenylene sulfide block copolymer, inorganic fillers may optionally, but not necessarily, be added to the extent that the desired effects are not adversely affected. Specific examples of inorganic fillers include fibrous fillers such as glass fibers, carbon fibers, carbon nanotubes, carbon nanohorns, potassium titanate whiskers, zinc oxide whiskers, calcium carbonate whiskers, wollastonite whiskers, aluminum borate whiskers, aramid fibers, alumina fibers, silicon carbide fibers, ceramic fibers, asbestos fibers, gypsum fibers, and metal fibers; and non-fibrous fillers including fullerene, talc, wollastonite, zeolite, sericite, mica, kaolin, clay, pyrophyllite, silica, bentonite, asbestos, silicates such as alumina silicate, metal compounds such as silicon oxide, magnesium oxide, alumina, zirconium oxide, titanium oxide, and iron oxide, carbonates such as calcium carbonate, magnesium carbonate, and dolomite, sulfates such as calcium sulfate and barium sulfate, hydroxides such as calcium hydroxide, magnesium hydroxide, and aluminum hydroxide, glass beads, glass flakes, glass powders, ceramic beads, boron nitride, silicon carbide, carbon black, silica, and graphite. Of these, glass fibers, silica, and calcium carbonate are preferred, and calcium carbonate and silica are particularly preferred in terms of anticorrosion and lubrication. These inorganic fillers may be hollow and may be used in a combination of two or more. These inorganic fillers may be pre-treated before use with a coupling agent such as an isocyanate compound, an organosilane compound, an organotitanate compound, an organoborane compound, or an epoxy compound. In particular, calcium carbonate, silica, and carbon black are preferred in terms of anticorrosion, lubrication, and electrical conductivity impartation.

The amount of inorganic filler is 30 parts by weight or less, preferably less than 10 parts by weight, more preferably less than 1 part by weight, and still more preferably 0.8 parts by weight or less, based on 100 parts by weight of the polyphenylene sulfide block copolymer (a). Although there is no lower limit, it is preferably 0.0001 part by weight or more. The amount of inorganic filler can be appropriately varied depending on the balance between toughness and rigidity required for the intended use. Inorganic fillers in an amount in this preferred range are effective in improving the elastic modulus of the material and also prevent the decrease in toughness.

Other Additives

Furthermore, to the polyphenylene sulfide block copolymer, any resins other than polyphenylene sulfides may be added to the extent that the desired effects are not adversely affected. Specific examples include polyamide resins, polybutylene terephthalate resins, polyethylene terephthalate resins, modified polyphenylene ether resins, polysulfone resins, polyarylsulfone resins, polyketone resins, polyarylate resins, liquid crystal polymers, polyether ketone resins, polythioether ketone resins, polyether ether ketone resins, polyimide resins, polyetherimide resins, polyethersulfone resins, polyamide-imide resins, and polytetrafluoroethylene resins.

Furthermore, compounds as described below can be added for the purpose of modification. Customary additives can be added, including plasticizers such as polyalkylene oxide oligomer compounds, thioether compounds, ester compounds, and organophosphorus compounds; crystal nucleating agents such as organophosphorus compounds and polyether ether ketone; mold release agents such as montanic acid waxes, metallic soaps (e.g., lithium stearate, aluminum stearate), ethylenediamine-stearic acid-sebacic acid polycondensates, and silicone compounds; color inhibitors such as hypophosphites; phenolic antioxidants such as (3,9-bis[2-(3-(3-t-butyl-4-hydroxy-5-methylphenyl)propionyloxy)-1,1-dimethylethyl]-2,4,8,10-tetraoxaspiro[5,5]undecane); phosphorus antioxidants such as (bis(2,4-di-cumylphenyl)pentaerythritol-di-phosphite); water; lubricants; ultraviolet absorbers; colorants; and blowing agents. The amount of these compounds is preferably 10% by weight or less, more preferably 1% by weight or less, based on the total amount of the composition. Within this preferred range, degradation of inherent properties cannot occur.

EXAMPLES

Our copolymers and methods will now be described in detail with reference to examples. These examples are for illustrative purposes only and should not be construed as limiting.

Measurement of Molecular Weight

For the molecular weights of the polyphenylene sulfide (A), the cyclic polyphenylene sulfide (a), and a polyphenylene sulfide block copolymer, a number-average molecular weight (Mn), a weight-average molecular weight (Mw), and a polydispersity index (=Mw/Mn) in terms of polystyrene were determined by gel permeation chromatography (GPC), a type of size exclusion chromatography (SEC). The measurement conditions of GPC are given below:

Apparatus: SSC-7100 available from Senshu Scientific co., ltd.

Column: GPC 3506 available from Senshu Scientific co., ltd.

Eluent: 1-chloronaphthalene

Detector: differential refractive index detector

Column temperature: 210° C.

Pre-thermostat bath temperature: 250° C.

Pump thermostat bath temperature: 50° C.

Detector temperature: 210° C.

Flow rate: 1.0 mL/min

Sample injection volume: 300 μL (a slurry of about 0.2% by weight).

Measurements of Glass-Transition Temperature and Melting Point

Amorphous films of the polyphenylene sulfide (A) and a polyphenylene sulfide block copolymer were prepared, and their glass-transition temperatures and melting points were measured by differential scanning calorimetry (DSC).

Press films were prepared according to the following procedure:

The surface of a "Kapton" (registered trademark) film is cleaned with acetone, and a sample is placed thereon.

Another "Kapton" (registered trademark) film is stacked, and the stack is sandwiched between aluminum sheets.

The resulting stack is placed in a press mold heated to 340° C.

After retention for one minute, a pressure of 10 kgf is applied.

After retention for three minutes, a pressure of 40 kgf is applied.

After retention for four minutes, the sample is taken out together with the "Kapton" (registered trademark) films optionally with the aluminum sheets and immersed in water for quenching.

The measurements of glass-transition temperatures and melting points by differential scanning calorimetry were carried out under the following conditions.

Measurement of Glass-Transition Temperature

The glass-transition temperature was defined as an inflection point of a baseline shift observed when the temperature was raised from 0° C. to 340° C. at a rate of 20° C./min.

Measurement of Melting Point

The melting point is a melting peak temperature observed when the temperature is raised from 0° C. to 340° C. at a rate of 20° C./min, held at 340° C. for 1 minute, lowered to 100° C. at a rate of 20° C./min, held at 100° C. for 1 minute, and then raised from 100° C. to 340° C. at a rate of 20° C./min.

Measurements of Tensile Modulus and Tensile Elongation

The tensile modulus and the tensile elongation of a polyphenylene sulfide block copolymer were measured such that a 0.2-mm-thick dumbbell specimen was punched out of a press film prepared by the above method, and then the specimen was subjected to a tensile test using a Tensilon UTA2.5T tensile tester under the conditions of a chuck distance of 25 mm and a tensile speed of 1 mm/min.

Analysis of Polyorganosiloxane Units Content

The polyorganosiloxane units content of a polyphenylene sulfide block copolymer was calculated by multiplying the molar fraction of Si atoms determined by elemental analysis by the molecular weight of the organosiloxane repeating units.

Analysis of Carboxyl Group Content

The amount of carboxyl group introduced into the polyphenylene sulfide (A) was estimated by measuring an amorphous film of polyphenylene sulfide with an FT-IR (Model IR-810 infrared spectrophotometer available from JASCO Corporation) and comparing an absorption at or near 1,730 cm$^{-1}$, attributed to carboxyl groups, with an absorption at or near 1,900 cm$^{-1}$, attributed to benzene rings.

Analysis of Amino Group Content

The amount of amino group introduced into the polyphenylene sulfide (A) was estimated by measuring an amorphous film of polyphenylene sulfide with an FT-IR (Model IR-810 infrared spectrophotometer available from JASCO Corporation) and comparing an absorption at or near 3,380 and 3,470 cm$^{-1}$, attributed to amino groups, with an absorption at or near 1,900 cm$^{-1}$, attributed to benzene rings.

Measurement of Conversion

The conversion of the cyclic polyphenylene sulfide (a) into the polyphenylene sulfide (A) was calculated by the process described below using high-performance liquid chromatography (HPLC).

About 10 mg of a product resulting from the heating of the cyclic polyphenylene sulfide (a) was dissolved in about 5 g of 1-chloronaphthalene at 250° C. The resulting mixture was cooled to room temperature to form a precipitate. Using a membrane filter with a pore size of 0.45 μm, 1-chloronaphthalene-insoluble matter was filtered off to give 1-chloronaphthalene-soluble matter. The soluble matter obtained was subjected to HPLC measurement to quantitatively determine the amount of unreacted cyclic polyphenylene sulfide, and the conversion of the cyclic polyphenylene sulfide (a) into the polyphenylene sulfide (A) was calculated. The measurement conditions of HPLC are given below:

Apparatus: LC-10Avp series available from SHIMADZU CORPORATION
Column: Mightysil RP-18 GP150-4.6 (5 μm)
Detector: photodiode array detector (UV=270 nm).

Reference Example 1: Method of Producing Polyphenylene Sulfide (A) (Carboxyl Group)

Into a 70-liter autoclave equipped with a stirrer and a valve with a bottom plug were loaded 8.27 kg (70.0 mol) of 47.5% sodium hydrosulfide, 3.03 kg (72.69 mol) of 96% sodium hydroxide, 11.45 kg (115.50 mol) of N-methyl-2-pyrrolidone (NMP), and 5.50 kg of ion-exchanged water. At normal pressure under nitrogen, the mixture was gradually heated to 225° C. over about 3 hours. When 9.82 kg of water and 0.28 kg of NMP were distilled out, the heating was stopped and cooling was started. At this point, the amount of residual water in the system, inclusive of the water consumed in the hydrolysis of NMP, was 1.01 moles per mole of the alkali metal hydrosulfide loaded. The amount of stripped hydrogen sulfide was 1.4 moles, and thus, the amount of sulfidizing agent in the system after the process was 68.6 moles.

After that, the mixture was cooled to 200° C., and 10.08 kg (68.60 mol) of p-dichlorobenzene (p-DCB), 0.213 kg (1.36 mol) of 4-chlorobenzoic acid, and 9.37 kg (94.50 mol) of NMP were added thereto. The reaction vessel was then sealed under nitrogen gas, and the mixture was heated to 250° C. at a rate of 0.6° C./min with stirring at 240 rpm and allowed to react at 250° C. for 180 minutes.

Immediately after completion of the reaction, the valve with a bottom plug of the autoclave was opened to flash the contents into an apparatus equipped with an agitator. The contents were dried in the apparatus equipped with an agitator at 230° C. for 1.5 hours until 95% or more of the NMP used in polymerization was volatilized away, and a solid containing PPS and salts was recovered.

The solid recovered and 74 liters of ion-exchanged water were placed in an autoclave equipped with an agitator, washed at 75° C. for 15 minutes, and then filtered through a filter to give a cake. The cake obtained was washed with ion-exchanged water at 75° C. for 15 minutes and filtered. This operation was repeated three times, and then the cake, 74 liters of ion-exchanged water, and 0.4 kg of acetic acid were placed in the autoclave equipped with an agitator. The autoclave was purged with nitrogen and then heated to 195° C. After that, the autoclave was cooled, and the contents were taken out. The contents were filtered through a filter to give a cake. The cake obtained was dried under a stream of nitrogen at 120° C. to yield a dry PPS.

GPC showed that the polyphenylene sulfide (A) obtained had a weight-average molecular weight of 18,000, a number-average molecular weight of 5,200, and a polydispersity index (weight-average molecular weight (Mw)/number-average molecular weight (Mn)) of 3.41. The carboxyl group content per gram of the polyphenylene sulfide (A) obtained was 141 ☐mol. The polyphenylene sulfide (A) produced in this manner is named A-1.

Reference Example 2: Method of Producing Polyphenylene Sulfide (A) (Carboxyl Group)

Into a 70-liter autoclave equipped with a stirrer and a valve with a bottom plug were loaded 8.27 kg (70.0 mol) of 47.5% sodium hydrosulfide, 3.15 kg (75.67 mol) of 96% sodium hydroxide, 11.45 kg (115.50 mol) of N-methyl-2-pyrrolidone (NMP), and 5.50 kg of ion-exchanged water. At normal pressure under nitrogen, the mixture was gradually heated to 225° C. over about 3 hours. When 9.82 kg of water and 0.28 kg of NMP were distilled out, the heating was stopped and cooling was started. At this point, the amount of residual water in the system, inclusive of the water consumed in the hydrolysis of NMP, was 1.01 moles per mole of the alkali metal hydrosulfide loaded. The amount of stripped hydrogen sulfide was 1.6 moles, and thus, the amount of sulfidizing agent in the system after the process was 68.4 moles.

After that, the mixture was cooled to 200° C., and 9.88 kg (67.2 mol) of p-dichlorobenzene (p-DCB), 1.07 kg (6.86 mol) of 4-chlorobenzoic acid, and 9.37 kg (94.50 mol) of NMP were added thereto. The reaction vessel was then sealed under nitrogen gas, and the mixture was heated to 250° C. at a rate of 0.6° C./min with stirring at 240 rpm and allowed to react at 250° C. for 180 minutes.

Immediately after completion of the reaction, the valve with a bottom plug of the autoclave was opened to flash the contents into an apparatus equipped with an agitator. The contents were dried in the apparatus equipped with an agitator at 230° C. for 1.5 hours until 95% or more of the NMP used in polymerization was volatilized away, and a solid containing PPS and salts was recovered.

The solid recovered and 74 liters of ion-exchanged water were placed in an autoclave equipped with an agitator, washed at 75° C. for 15 minutes, and then filtered through a filter to give a cake. The cake obtained was washed with ion-exchanged water at 75° C. for 15 minutes and filtered. This operation was repeated three times, and then the cake, 74 liters of ion-exchanged water, and 0.4 kg of acetic acid were placed in the autoclave equipped with an agitator. The autoclave was purged with nitrogen and then heated to 195° C. After that, the autoclave was cooled, and the contents were taken out. The contents were filtered through a filter to give a cake. The cake obtained was dried under a stream of nitrogen at 120° C. to yield a dry PPS.

GPC showed that the polyphenylene sulfide (A) obtained had a weight-average molecular weight of 9,900, a number-average molecular weight of 3,900, and a polydispersity index (weight-average molecular weight (Mw)/number-average molecular weight (Mn)) of 2.54. The carboxyl group content per gram of the polyphenylene sulfide (A) obtained was 325 µmol. The polyphenylene sulfide (A) produced in this manner is named A-2.

Reference Example 3: Method of Producing Polyphenylene Sulfide (A) (Carboxyl Group)

Into a 70-liter autoclave equipped with a stirrer and a valve with a bottom plug were loaded 8.27 kg (70.0 mol) of 47.5% sodium hydrosulfide, 3.19 kg (76.44 mol) of 96% sodium hydroxide, 11.45 kg (115.50 mol) of N-methyl-2-pyrrolidone (NMP), and 5.50 kg of ion-exchanged water. At normal pressure under nitrogen, the mixture was gradually heated to 225° C. over about 3 hours. When 9.82 kg of water and 0.28 kg of NMP were distilled out, the heating was stopped and cooling was started. At this point, the amount of residual water in the system, inclusive of the water consumed in the hydrolysis of NMP, was 1.01 moles per mole of the alkali metal hydrosulfide loaded. The amount of stripped hydrogen sulfide was 1.3 moles, and thus, the amount of sulfidizing agent in the system after the process was 68.7 moles.

After that, the mixture was cooled to 200° C., and 9.68 kg (65.9 mol) of p-dichlorobenzene (p-DCB), 1.07 kg (6.86 mol) of 4-chlorobenzoic acid, and 9.37 kg (94.50 mol) of NMP were added thereto. The reaction vessel was then sealed under nitrogen gas, and the mixture was heated to 250° C. at a rate of 0.6° C./min with stirring at 240 rpm and allowed to react at 250° C. for 180 minutes.

Immediately after completion of the reaction, the valve with a bottom plug of the autoclave was opened to flash the contents into an apparatus equipped with an agitator. The contents were dried in the apparatus equipped with an agitator at 230° C. for 1.5 hours until 95% or more of the NMP used in polymerization was volatilized away, and a solid containing PPS and salts was recovered.

The solid recovered and 74 liters of ion-exchanged water were placed in an autoclave equipped with an agitator, washed at 75° C. for 15 minutes, and then filtered through a filter to give a cake. The cake obtained was washed with ion-exchanged water at 75° C. for 15 minutes and filtered. This operation was repeated three times, and then the cake, 74 liters of ion-exchanged water, and 0.4 kg of acetic acid were placed in the autoclave equipped with an agitator. The autoclave was purged with nitrogen and then heated to 195° C. After that, the autoclave was cooled, and the contents were taken out. The contents were filtered through a filter to give a cake. The cake obtained was dried under a stream of nitrogen at 120° C. to yield a dry PPS.

GPC showed that the polyphenylene sulfide (A) obtained had a weight-average molecular weight of 7,400, a number-average molecular weight of 3,500, and a polydispersity index (weight-average molecular weight (Mw)/number-average molecular weight (Mn)) of 2.11. The carboxyl group content per gram of the polyphenylene sulfide (A) obtained was 478 µmol. The polyphenylene sulfide (A) produced in this manner is named A-3.

Reference Example 4: Method of Producing Polyphenylene Sulfide (A) (Carboxyl Group)

Into a 70-liter autoclave equipped with a stirrer and a valve with a bottom plug were loaded 8.27 kg (70.0 mol) of 47.5% sodium hydrosulfide, 3.14 kg (75.46 mol) of 96% sodium hydroxide, 11.45 kg (115.50 mol) of N-methyl-2-pyrrolidone (NMP), and 5.50 kg of ion-exchanged water. At normal pressure under nitrogen, the mixture was gradually heated to 225° C. over about 3 hours. When 9.82 kg of water and 0.28 kg of NMP were distilled out, the heating was stopped and cooling was started. At this point, the amount of residual water in the system, inclusive of the water consumed in the hydrolysis of NMP, was 1.01 moles per mole of the alkali metal hydrosulfide loaded. The amount of stripped hydrogen sulfide was 1.4 moles, and thus, the amount of sulfidizing agent in the system after the process was 68.6 moles.

After that, the mixture was cooled to 200° C., and 9.62 kg (65.5 mol) of p-dichlorobenzene (p-DCB), 1.07 kg (6.86 mol) of 4-chlorobenzoic acid, and 9.37 kg (94.50 mol) of NMP were added thereto. The reaction vessel was then sealed under nitrogen gas, and the mixture was heated to 250° C. at a rate of 0.6° C./min with stirring at 240 rpm and allowed to react at 250° C. for 180 minutes.

Immediately after completion of the reaction, the valve with a bottom plug of the autoclave was opened to flash the contents into an apparatus equipped with an agitator. The contents were dried in the apparatus equipped with an agitator at 230° C. for 1.5 hours until 95% or more of the NMP used in polymerization was volatilized away, and a solid containing PPS and salts was recovered.

The solid recovered and 74 liters of ion-exchanged water were placed in an autoclave equipped with an agitator, washed at 75° C. for 15 minutes, and then filtered through a filter to give a cake. The cake obtained was washed with ion-exchanged water at 75° C. for 15 minutes and filtered. This operation was repeated three times, and then the cake, 74 liters of ion-exchanged water, and 0.4 kg of acetic acid were placed in the autoclave equipped with an agitator. The autoclave was purged with nitrogen and then heated to 195° C. After that, the autoclave was cooled, and the contents were taken out. The contents were filtered through a filter to give a cake. The cake obtained was dried under a stream of nitrogen at 120° C. to yield a dry PPS.

GPC showed that the polyphenylene sulfide (A) obtained had a weight-average molecular weight of 5,100, a number-average molecular weight of 2,700, and a polydispersity index (weight-average molecular weight (Mw)/number-average molecular weight (Mn)) of 1.89. The carboxyl group content per gram of the polyphenylene sulfide (A) obtained was 532 µmol. The polyphenylene sulfide (A) produced in this manner is named A-4.

Reference Example 5-1: Preparation of Cyclic Polyarylene Sulfide (a)

Into a stainless-steel autoclave equipped with an agitator were loaded 14.03 g (0.120 mol) of a 48% by weight aqueous solution of sodium hydrosulfide, 12.50 g (0.144 mol) of a 48% by weight aqueous solution prepared using 96% sodium hydroxide, 615.0 g (6.20 mol) of N-methyl-2-pyrrolidone (NMP), and 18.08 g (0.123 mol) of p-dichlorobenzene (p-DCB). The reaction vessel was thoroughly purged with nitrogen and then sealed under nitrogen gas.

While stirring at 400 rpm, the temperature was raised from room temperature to 200° C. over about 1 hour. At this point, the pressure (the gauge pressure) in the reaction vessel was 0.35 MPa. The temperature was then raised from 200° C. to 270° C. over about 30 minutes. The pressure (the gauge pressure) in the reaction vessel at this point was 1.05 MPa. After the vessel was maintained at 270° C. for 1 hour, the vessel was rapidly cooled to near room temperature, and then the contents were recovered.

The contents obtained were analyzed by gas chromatography and high-performance liquid chromatography to show that the consumption of the p-DCB monomer was 93%, and the production of cyclic polyphenylene sulfide was 18.5% assuming that all the sulfur components in the reaction mixture would convert into cyclic polyphenylene sulfide.

The contents in an amount of 500 g were diluted with about 1,500 g of ion-exchanged water and then filtered through a glass filter with an average opening size of 10 to 16 µm. The residue on the filter was dispersed in about 300 g of ion-exchanged water, stirred at 70° C. for 30 minutes, and again filtered in the same manner as above. This operation was repeated three times to yield a white solid. The solid was vacuum dried at 80° C. overnight to yield a dry solid.

The solid obtained was placed in an extraction thimble and subjected to Soxhlet extraction for about 5 hours using chloroform as a solvent to separate low-molecular-weight components in the solid.

After the extraction operation, the solid components remained in the extraction thimble were vacuum dried at 70° C. overnight to yield about 6.98 g of an off-white solid. The solid was analyzed, and the absorption spectrum obtained by infrared spectroscopy indicated that the solid was a compound having a phenylene sulfide structure with a weight-average molecular weight of 6,300.

From the extract obtained by the extraction operation using chloroform, the solvent was removed, and then about 5 g of chloroform was added to prepare a slurry. The slurry was added dropwise with stirring to about 300 g of methanol. The resulting precipitate was recovered by filtration and vacuum dried at 70° C. for 5 hours to yield 1.19 g of a white solid. This white powder was confirmed by the absorption spectrum obtained by infrared spectroscopy to be a compound composed of phenylene sulfide units. Furthermore, components divided into each component by high-performance liquid chromatography were analyzed by mass spectrum analysis (apparatus: M-1200H available from Hitachi, Ltd.) and further MALDI-TOF-MS. The molecular weight information obtained showed that the white powder was a cyclic polyphenylene sulfide mixture composed mainly of p-phenylene sulfide units, containing a cyclic compound of 4 to 13 repeating units in an amount of about 98% by weight, and suitable for use in the production of the polyphenylene sulfide (A). GPC showed that the cyclic polyphenylene sulfide mixture was all soluble in 1-chloronaphthalene at room temperature and had a weight-average molecular weight of 900.

Reference Example 5-2: Method of Producing Polyphenylene Sulfide (A) (Amino Group)

A powder mixture of 20 g of the cyclic polyphenylene sulfide mixture (a) obtained by the method described in Reference Example 2-1 and 2.0 g (5.0 mol %), per mole of polyphenylene sulfide units, of bis(4-aminophenyl) sulfide was placed in a glass ampule, and the ampule was purged with nitrogen. The ampule was placed in an electric furnace conditioned at 340° C. and heated for 60 minutes, after which the ampule was taken out and cooled to room temperature to yield a black solid. The product was all soluble in 1-chloronaphthalene at 250° C. HPLC showed that the conversion of the cyclic polyphenylene sulfide (a) into the polyphenylene sulfide (A) was 96.5%.

GPC showed that the polyphenylene sulfide obtained had a weight-average molecular weight of 15,000, a number-average molecular weight of 10,000, and a polydispersity index (weight-average molecular weight (Mw)/number-average molecular weight (Mn)) of 1.50. The amino group content per gram of the polyphenylene sulfide (A) obtained was 140 □mol. The polyphenylene sulfide (A) produced in this manner is named A-5.

Reference Example 6: Versatile Method of Producing Polyphenylene Sulfide

Into a 70-liter autoclave equipped with a stirrer and a valve with a bottom plug were loaded 8.27 kg (70.00 mol) of 47.5% sodium hydrosulfide, 2.94 kg (70.63 mol) of 96% sodium hydroxide, 11.45 kg (115.50 mol) of N-methyl-2-pyrrolidone (NMP), 1.89 kg (23.1 mol) of sodium acetate, and 5.50 kg of ion-exchanged water. At normal pressure under nitrogen, the mixture was gradually heated to 245° C. over about 3 hours. When 9.77 kg of water and 0.28 kg of NMP were distilled out, the heating was stopped and cooling was started. At this point, the amount of residual water in the system, inclusive of the water consumed in the hydrolysis of NMP, was 1.01 moles per mole of the alkali metal hydrosulfide loaded. The amount of stripped hydrogen sulfide was 1.4 moles and, thus, the amount of sulfidizing agent in the system after the process was 68.6 moles.

After that, the mixture was cooled to 200° C., and p-dichlorobenzene (p-DCB) 10.44 kg (71.00 mol), and 9.37 kg (94.50 mol) of NMP were added thereto. The reaction vessel was then sealed under nitrogen gas, and the mixture heated from 200° C. to 270° C. at a rate of 0.6° C./min with stirring at 240 rpm and allowed to react at 270° C. for 140 minutes. After that, 2.40 kg (133 mol) of water was injected while cooling from 270° C. to 250° C. over 15 minutes. After that, the mixture was cooled gradually from 250° C. to 220° C. over 75 minutes and then rapidly to near room temperature, and the contents were taken out.

The contents were diluted with about 35 liters of NMP into a slurry. The slurry was stirred at 85° C. for 30 minutes and then filtered through an 80-mesh wire net (opening size: 0.175 mm) to yield a solid. The solid obtained was washed with about 35 liters of NMP and filtered in the same manner. The solid obtained was diluted with 70 liters of ion-exchanged water, stirred at 70° C. for 30 minutes, and then filtered through an 80-mesh wire net to yield a solid. This operation was repeated three times. The solid obtained and 32 g of acetic acid were diluted with 70 liters of ion-exchanged water, stirred at 70° C. for 30 minutes, and then filtered through an 80-mesh wire net. Furthermore, the solid obtained was diluted with 70 liters of ion-exchanged water, stirred at 70° C. for 30 minutes, and then filtered through an 80-mesh wire net to yield a solid. The solid thus obtained was dried under a stream of nitrogen at 120° C. to yield a dry PPS.

GPC showed that the polyphenylene sulfide (A) obtained had a weight-average molecular weight of 21,000, a number-average molecular weight of 7,000, and a polydispersity index (weight-average molecular weight (Mw)/number-average molecular weight (Mn)) of 3.00. The carboxyl group content per gram of the polyphenylene sulfide (A) obtained was 59 µmol. The polyphenylene sulfide (A) produced in this manner is named A-6.

Reference Example 7: Method of Producing Polyphenylene Sulfide (A) (Amino Group)

Into a 70-liter autoclave equipped with a stirrer and a valve with a bottom plug were loaded 8.27 kg (70.0 mol) of 47.5% sodium hydrosulfide, 3.03 kg (72.69 mol) of 96% sodium hydroxide, 11.45 kg (115.50 mol) of N-methyl-2-pyrrolidone (NMP), and 5.50 kg of ion-exchanged water. At normal pressure under nitrogen, the mixture was gradually heated to 225° C. over about 3 hours. When 9.82 kg of water and 0.28 kg of NMP were distilled out, the heating was stopped and cooling started. At this point, the amount of residual water in the system, inclusive of the water consumed in the hydrolysis of NMP, was 1.01 moles per mole of the alkali metal hydrosulfide loaded. The amount of stripped hydrogen sulfide was 1.4 moles and, thus, the amount of sulfidizing agent in the system after the process was 68.6 moles.

After that, the mixture was cooled to 200° C., and 10.08 kg (68.60 mol) of p-dichlorobenzene (p-DCB), 0.559 kg (3.43 mol) of dichloroaniline, and 9.37 kg (94.50 mol) of NMP were added thereto. The reaction vessel was then sealed under nitrogen gas, and the mixture was heated to 250° C. at a rate of 0.6° C./min with stirring at 240 rpm and allowed to react at 250° C. for 180 minutes.

Immediately after completion of the reaction, the valve with a bottom plug of the autoclave was opened to flash the contents into an apparatus equipped with an agitator. The contents were dried in the apparatus equipped with an agitator at 230° C. for 1.5 hours until 95% or more of the NMP used in polymerization was volatilized away, and a solid containing PPS and salts recovered.

The solid recovered and 74 liters of ion-exchanged water were placed in an autoclave equipped with an agitator, washed at 75° C. for 15 minutes, and then filtered through a filter to give a cake. The cake obtained was washed with ion-exchanged water at 75° C. for 15 minutes and filtered. This operation was repeated three times, and then the cake, 74 liters of ion-exchanged water, and 0.4 kg of acetic acid were placed in the autoclave equipped with an agitator. The autoclave was purged with nitrogen and then heated to 195° C. After that, the autoclave was cooled, and the contents taken out. The contents were filtered through a filter to give a cake. The cake obtained was dried under a stream of nitrogen at 120° C. to yield a dry PPS.

GPC showed that the polyphenylene sulfide (A) obtained had a weight-average molecular weight of 28,000, a number-average molecular weight of 7,800, and a polydispersity index (weight-average molecular weight (Mw)/number-average molecular weight (Mn)) of 3.59. The amino group content per gram of the polyphenylene sulfide (A) obtained was 108 µmol. The polyphenylene sulfide (A) produced in this manner is named A-7. The A-7 has an amino group not at an end but in its main chain. This structure is different from the structure represented by general formula (I).

Reference Example 8-1: Method of Producing Polyphenylene Sulfide Oligomer

Into an eggplant-shaped flask equipped with a reflux condenser and a stirrer were loaded 9.37 g (0.12 mol) of anhydrous sodium sulfide, 35.7 g (0.14 mol) of 4,4-dichlorodiphenyl sulfide, and 102.8 g (1.04 mol) of N-methyl-2-pyrrolidone (NMP). The mixture was refluxed at 200° C. for 3 hours in a nitrogen atmosphere.

The reaction mixture was then poured into water and filtered to give a crude product. The crude product was then extracted with 300 ml of hot toluene to give 27.2 g of an oligomer insoluble in toluene.

Reference Example 8-2: Method of Producing Polyphenylene Sulfide (A) (Amino Group)

Into an autoclave equipped with a stirring bar were loaded 11.64 g (0.065 mol) of a polyphenylene sulfide oligomer obtained by the method described in Reference Example 5-1, 4.0 g (0.03 mol) of p-aminothiophenol, 5.3 g (0.038 mol) of anhydrous potassium carbonate, and 102.8 g (1.04 mol) of N-methyl-2-pyrrolidone (NMP). In a nitrogen atmosphere, the mixture was stirred at 130° C. for 1 hour and then stirred at 140° C. to 150° C. for 1.5 hours. The reaction mixture was then heated at 220° C. for 15 minutes and held at 200° C. for 20 minutes. After the resulting solution was cooled, 400 ml of water poured into the solution, and a precipitated crude product recovered by filtration. The crude product was washed with methanol and then vacuum dried to give 12.15 g of polyphenylene sulfide.

GPC showed that the polyphenylene sulfide (A) obtained had a weight-average molecular weight of 5,500, a number-average molecular weight of 2,500, and a polydispersity index (weight-average molecular weight (Mw)/number-average molecular weight (Mn)) of 2.20. The amino group content per gram of the polyphenylene sulfide (A) obtained was 60 µmol. The polyphenylene sulfide (A) produced in this manner is named A-8.

Reference Example 9: Polydimethylsiloxane (B) Having Functional Groups (Epoxy Group)

A commercially available epoxy-modified polydimethylsiloxane ("KF-105" available from Shin-Etsu Chemical Co., Ltd.) was used (functional group content: 2,041 µmol/g).

Example 1

Into a 100 mL autoclave equipped with a stirring blade were weighed 16.2 g of the polyphenylene sulfide (A-1) and 5.6 g of the polydimethylsiloxane (B) having functional groups described in Reference Example 9. The autoclave was sealed under nitrogen and purged with nitrogen three times.

The reaction was carried out under the following temperature conditions: heating with a heating jacket at 250° C. for 10 minutes under stirring, followed by holding at 340° C. for 60 minutes. After completion of the reaction, the autoclave was rapidly cooled to yield a product.

To recover the product, the polymerization product was washed with hexane at 50° C. for 15 minutes and filtered. This operation was carried out three times to give a polyphenylene sulfide block copolymer.

GPC showed that the polyphenylene sulfide block copolymer obtained had a weight-average molecular weight of 41,000, a number-average molecular weight of 12,000, and a polydispersity index (weight-average molecular weight (Mw)/number-average molecular weight (Mn)) of 3.42. The polydimethylsiloxane (PDMS) units content of the polyphenylene sulfide block copolymer was 3.8%, which was calculated by multiplying the molar fraction of Si atoms determined by elemental analysis by the molecular weight of dimethylsiloxane repeating units. Other results are shown in Tables 1 and 2. A press film of the polyphenylene sulfide block copolymer was prepared as described below. The film had good self-supporting properties and releasability.

- The surface of a "Kapton" (registered trademark) film is cleaned with acetone, and a sample placed thereon.
- Another "Kapton" (registered trademark) film is stacked, and the stack sandwiched between aluminum sheets.
- The resulting stack is placed in a press mold heated to 340° C.
- After retention for one minute, a pressure of 10 kgf is applied.
- After retention for three minutes, a pressure of 40 kgf is applied.
- After retention for four minutes, the sample is taken out together with the "Kapton" (registered trademark) films optionally with the aluminum sheets and immersed in water for quenching.

In the Examples, the conditions of press films of polyphenylene sulfide block copolymers were evaluated according to the following criteria:
- Bad: very brittle
- Fair: slightly self-supporting
- Good: flexible and self-supporting well
- Excellent: very flexible and self-supporting well.

Example 2

Into a 100 mL autoclave equipped with a stirring blade were weighed 16.2 g of the polyphenylene sulfide (A-1) and 3.4 g of the polydimethylsiloxane (B) having functional groups described in Reference Example 9. The autoclave was sealed under nitrogen and purged with nitrogen three times.

The reaction was carried out under the following temperature conditions: heating with a heating jacket at 250° C. for 10 minutes under stirring, followed by holding at 340° C. for 60 minutes. After completion of the reaction, the autoclave was rapidly cooled to yield a product.

To recover the product, the polymerization product was washed with hexane at 50° C. for 15 minutes and filtered. This operation was carried out three times to give a polyphenylene sulfide block copolymer.

GPC showed that the polyphenylene sulfide block copolymer obtained had a weight-average molecular weight of 38,000, a number-average molecular weight of 9,300, and a polydispersity index (weight-average molecular weight (Mw)/number-average molecular weight (Mn)) of 4.09. The polydimethylsiloxane (PDMS) units content of the polyphenylene sulfide block copolymer was determined in the same manner as in Example 1 to be 4.3%. Other results are shown in Table 2. A press film of the polyphenylene sulfide block copolymer was prepared in the same manner as in Example 1. The film had good self-supporting properties and releasability.

Example 3

Into a 100 mL autoclave equipped with a stirring blade were weighed 16.2 g of the polyphenylene sulfide (A-1) and 10.1 g of the polydimethylsiloxane (B) having functional groups described in Reference Example 9. The autoclave was sealed under nitrogen and purged with nitrogen three times.

The reaction was carried out under the following temperature conditions: heating with a heating jacket at 250° C. for 10 minutes under stirring, followed by holding at 340° C. for 60 minutes. After completion of the reaction, the autoclave was rapidly cooled to yield a product.

To recover the product, the polymerization product was washed with hexane at 50° C. for 15 minutes and filtered. This operation was carried out three times to give a polyphenylene sulfide block copolymer.

GPC showed that the polyphenylene sulfide block copolymer obtained had a weight-average molecular weight of 51,000, a number-average molecular weight of 12,000, and a polydispersity index (weight-average molecular weight (Mw)/number-average molecular weight (Mn)) of 4.25. The polydimethylsiloxane (PDMS) units content of the polyphenylene sulfide block copolymer was determined in the same manner as in Example 1 to be 9.8%. Other results are shown in Table 2. A press film of the polyphenylene sulfide block copolymer was prepared in the same manner as in Example 1. The film had good self-supporting properties and releasability.

Example 4

Into a 100 mL autoclave equipped with a stirring blade were weighed 16.2 g of the polyphenylene sulfide (A-1), 44.6 g of N-methyl-2-pyrrolidone (NMP), and 10.1 g of the polydimethylsiloxane (B) having functional groups described in Reference Example 9. The autoclave was sealed under nitrogen and purged with nitrogen three times.

The reaction was carried out under the following temperature conditions: heating with a heating jacket, and holding at 250° C. for 60 minutes under stirring. After completion of the reaction, the autoclave was rapidly cooled to yield a product.

To recover the product, the polymerization product was washed with hexane at 50° C. for 15 minutes and filtered, which operation was repeated twice, and then washed with ion-exchanged water at 75° C. for 15 minutes and filtered, which operation was repeated three times, to give a polyphenylene sulfide block copolymer.

GPC showed that the polyphenylene sulfide block copolymer obtained had a weight-average molecular weight of 35,000, a number-average molecular weight of 9,800, and a polydispersity index (weight-average molecular weight (Mw)/number-average molecular weight (Mn)) of 3.57. The polydimethylsiloxane (PDMS) units content of the polyphenylene sulfide block copolymer was determined in the same manner as in Example 1 to be 9.9%. Other results are shown in Table 2. A press film of the polyphenylene sulfide block copolymer was prepared in the same manner as in Example 1. The film had good self-supporting properties and releasability.

Example 5

Into a 100 mL autoclave equipped with a stirring blade were weighed 16.2 g of the polyphenylene sulfide (A-5) and 5.6 g of the polydimethylsiloxane (B) having functional groups described in Reference Example 9. The autoclave was sealed under nitrogen and purged with nitrogen three times.

The reaction was carried out under the following temperature conditions: heating with a heating jacket at 250° C. for 10 minutes under stirring, followed by holding at 340° C. for 60 minutes. After completion of the reaction, the autoclave was rapidly cooled to yield a product.

To recover the product, the polymerization product was washed with hexane at 50° C. for 15 minutes and filtered. This operation was carried out three times to give a polyphenylene sulfide block copolymer.

GPC showed that the polyphenylene sulfide block copolymer obtained had a weight-average molecular weight of 42,000, a number-average molecular weight of 14,000, and a polydispersity index (weight-average molecular weight (Mw)/number-average molecular weight (Mn)) of 3.00. The polydimethylsiloxane (PDMS) units content of the polyphenylene sulfide block copolymer was determined in the same manner as in Example 1 to be 4.0%. Other results are shown in Table 1. A press film of the polyphenylene sulfide block copolymer was prepared in the same manner as in Example 1. The film had good self-supporting properties and releasability.

Example 6

Into a 100 mL autoclave equipped with a stirring blade were weighed 16.2 g of the polyphenylene sulfide (A-2) and 12.9 g of the polydimethylsiloxane (B) having functional groups described in Reference Example 9. The autoclave was sealed under nitrogen and purged with nitrogen three times.

The reaction was carried out under the following temperature conditions: heating with a heating jacket at 250° C. for 10 minutes under stirring, followed by holding at 340° C. for 60 minutes. After completion of the reaction, the autoclave was rapidly cooled to yield a product.

To recover the product, the polymerization product was washed with hexane at 50° C. for 15 minutes and filtered. This operation was carried out three times to give a polyphenylene sulfide block copolymer.

GPC showed that the polyphenylene sulfide block copolymer obtained had a weight-average molecular weight of 57,000, a number-average molecular weight of 14,000, and a polydispersity index (weight-average molecular weight (Mw)/number-average molecular weight (Mn)) of 4.07. The polydimethylsiloxane (PDMS) units content of the polyphenylene sulfide block copolymer was determined in the same manner as in Example 1 to be 10.3%. Other results are shown in Table 2. A press film of the polyphenylene sulfide block copolymer was prepared in the same manner as in Example 1. The film had very excellent self-supporting properties and releasability.

Example 7

Into a 100 mL autoclave equipped with a stirring blade were weighed 16.2 g of the polyphenylene sulfide (A-3) and 19.0 g of the polydimethylsiloxane (B) having functional groups described in Reference Example 9. The autoclave was sealed under nitrogen and purged with nitrogen three times.

The reaction was carried out under the following temperature conditions: heating with a heating jacket at 250° C. for 10 minutes under stirring, followed by holding at 340° C. for 60 minutes. After completion of the reaction, the autoclave was rapidly cooled to yield a product.

To recover the product, the polymerization product was washed with hexane at 50° C. for 15 minutes and filtered. This operation was carried out three times to give a polyphenylene sulfide block copolymer.

GPC showed that the polyphenylene sulfide block copolymer obtained had a weight-average molecular weight of 52,000, a number-average molecular weight of 9,700, and a polydispersity index (weight-average molecular weight (Mw)/number-average molecular weight (Mn)) of 5.53. The polydimethylsiloxane (PDMS) units content of the polyphenylene sulfide block copolymer was determined in the same manner as in Example 1 to be 14.8%. Other results are shown in Table 2. A press film of the polyphenylene sulfide block copolymer was prepared in the same manner as in Example 1. The film had very excellent self-supporting properties and releasability.

Example 8

Into a 100 mL autoclave equipped with a stirring blade were weighed 16.2 g of the polyphenylene sulfide (A-4) and 21.1 g of the polydimethylsiloxane (B) having functional groups described in Reference Example 9. The autoclave was sealed under nitrogen and purged with nitrogen three times.

The reaction was carried out under the following temperature conditions: heating with a heating jacket at 250° C. for 10 minutes under stirring, followed by holding at 340° C. for 60 minutes. After completion of the reaction, the autoclave was rapidly cooled to yield a product.

To recover the product, the polymerization product was washed with hexane at 50° C. for 15 minutes and filtered. This operation was carried out three times to give a polyphenylene sulfide block copolymer.

GPC showed that the polyphenylene sulfide block copolymer obtained had a weight-average molecular weight of 44,000, a number-average molecular weight of 11,000, and a polydispersity index (weight-average molecular weight (Mw)/number-average molecular weight (Mn)) of 4.00. The polydimethylsiloxane (PDMS) units content of the polyphenylene sulfide block copolymer was determined in the same manner as in Example 1 to be 19.4%. Other results are shown in Table 2. A press film of the polyphenylene sulfide block copolymer was prepared in the same manner as in Example 1. The film had very excellent self-supporting properties and releasability.

Example 9

Into a 100 mL autoclave equipped with a stirring blade were weighed 16.2 g of the polyphenylene sulfide (A-3), 44.6 g of N-methyl-2-pyrrolidone (NMP), and 10.1 g of the polydimethylsiloxane (B) having functional groups described in Reference Example 9. The autoclave was sealed under nitrogen and purged with nitrogen three times.

The reaction was carried out under the following temperature conditions: heating with a heating jacket, and holding at 250° C. for 60 minutes under stirring. After completion of the reaction, the autoclave was rapidly cooled to yield a product.

To recover the product, the polymerization product was washed with hexane at 50° C. for 15 minutes and filtered, which operation was repeated twice, and then washed with ion-exchanged water at 75° C. for 15 minutes and filtered, which operation was repeated three times, to give a polyphenylene sulfide block copolymer.

GPC showed that the polyphenylene sulfide block copolymer obtained had a weight-average molecular weight of 35,000, a number-average molecular weight of 10,000, and a polydispersity index (weight-average molecular weight (Mw)/number-average molecular weight (Mn)) of 3.50. The polydimethylsiloxane (PDMS) units content of the polyphenylene sulfide block copolymer was determined in the same manner as in Example 1 to be 27.2%. Other results are shown in Table 2. A press film of the polyphenylene sulfide block copolymer was prepared in the same manner as in Example 1. The film had very excellent self-supporting properties and releasability.

Example 10

Into a 100 mL autoclave equipped with a stirring blade were weighed 16.2 g of the polyphenylene sulfide (A-1), 14.9 g of N-methyl-2-pyrrolidone (NMP), and 10.1 g of the polydimethylsiloxane (B) having functional groups described in Reference Example 9. The autoclave was sealed under nitrogen and purged with nitrogen three times.

The reaction was carried out under the following temperature conditions: heating with a heating jacket, and holding at 250° C. for 60 minutes under stirring. After completion of the reaction, the autoclave was rapidly cooled to yield a product.

To recover the product, the polymerization product was washed with hexane at 50° C. for 15 minutes and filtered, which operation was repeated twice, and then washed with ion-exchanged water at 75° C. for 15 minutes and filtered, which operation was repeated three times, to give a polyphenylene sulfide block copolymer.

GPC showed that the polyphenylene sulfide block copolymer obtained had a weight-average molecular weight of 52,000, a number-average molecular weight of 13,000, and a polydispersity index (weight-average molecular weight (Mw)/number-average molecular weight (Mn)) of 4.00. The polydimethylsiloxane (PDMS) units content of the polyphenylene sulfide block copolymer was determined in the same manner as in Example 1 to be 28.9%. Other results are shown in Table 2. A press film of the polyphenylene sulfide block copolymer was prepared in the same manner as in Example 1. The film had very excellent self-supporting properties and releasability.

Comparative Example 1

Into a 100 mL autoclave equipped with a stirring blade were weighed 16.2 g of the polyphenylene sulfide (A-6) and 2.3 g of the polydimethylsiloxane (B) having functional groups described in Reference Example 9. The autoclave was sealed under nitrogen and purged with nitrogen three times.

The reaction was carried out under the following temperature conditions: heating with a heating jacket at 250° C. for 10 minutes under stirring, followed by holding at 340° C. for 60 minutes. After completion of the reaction, the autoclave was rapidly cooled to yield a product.

To recover the product, the polymerization product was washed with hexane at 50° C. for 15 minutes and filtered. This operation was carried out three times to give a polyphenylene sulfide block copolymer.

GPC showed that the polyphenylene sulfide block copolymer obtained had a weight-average molecular weight of 31,000, a number-average molecular weight of 10,000, and a polydispersity index (weight-average molecular weight (Mw)/number-average molecular weight (Mn)) of 3.10. Other results are shown in Table 1. A press film of the polyphenylene sulfide block copolymer was prepared in the same manner as in Example 1. The film was too brittle to be subjected to a tensile test.

Comparative Example 2

Into a 100 mL autoclave equipped with a stirring blade were weighed 16.2 g of the polyphenylene sulfide (A-7) and 4.2 g of the polydimethylsiloxane (B) having functional groups described in Reference Example 9. The autoclave was sealed under nitrogen and purged with nitrogen three times.

The reaction was carried out under the following temperature conditions: heating with a heating jacket at 250° C. for 10 minutes under stirring, followed by holding at 340° C. for 60 minutes. After completion of the reaction, the autoclave was rapidly cooled to yield a product.

To recover the product, the polymerization product was washed with hexane at 50° C. for 15 minutes and filtered. This operation was carried out three times to give a polyphenylene sulfide block copolymer.

GPC showed that the polyphenylene sulfide block copolymer obtained had a weight-average molecular weight of 40,000, a number-average molecular weight of 9,000, and a polydispersity index (weight-average molecular weight (Mw)/number-average molecular weight (Mn)) of 4.44. Other results are shown in Table 1. A press film of the polyphenylene sulfide block copolymer was prepared in the same manner as in Example 1. The film was too brittle to be subjected to a tensile test.

Comparative Example 3

Into a 100 mL autoclave equipped with a stirring blade were weighed 16.2 g of the polyphenylene sulfide (A-8) and 2.4 g of the polydimethylsiloxane (B) having functional groups described in Reference Example 9. The autoclave was sealed under nitrogen and purged with nitrogen three times.

The reaction was carried out under the following temperature conditions: heating with a heating jacket at 250° C. for 10 minutes under stirring, followed by holding at 340° C. for 60 minutes. After completion of the reaction, the autoclave was rapidly cooled to yield a product.

To recover the product, the polymerization product was washed with hexane at 50° C. for 15 minutes and filtered. This operation was carried out three times to give a polyphenylene sulfide block copolymer.

GPC showed that the polyphenylene sulfide block copolymer obtained had a weight-average molecular weight of 28,000, a number-average molecular weight of 13,000, and a polydispersity index (weight-average molecular weight (Mw)/number-average molecular weight (Mn)) of 2.15. Other results are shown in Table 1. A press film of the polyphenylene sulfide block copolymer was prepared in the same manner as in Example 1. The film was too brittle to be subjected to a tensile test.

Comparative Example 4

The polyphenylene sulfide (A-6) in an amount of 87.3% by weight, 12.7% by weight of a poly(ether imide-siloxane) copolymer ("SILTEM 1500" available from SABIC Innovative Plastics) containing 30% by weight of polyorganosiloxane units, and 1 part by weight of 3-isocy-anatepropyl-triethoxysilane (KBE-9007 available from Shin-Etsu Chemical Co., Ltd.) were dry blended. The blend was then melt kneaded in a Japan Steel Works Model TEX30α twin-screw extruder (L/D=45, five kneading units), equipped with a vacuum vent, under the conditions of a screw speed of 300 rpm and a cylinder temperature set to ensure that the temperature of resin discharged through a die would be 330° C. or lower. A strand discharged through the die was rapidly cooled in a water bath to give a polyphenylene sulfide resin composition.

A press film of the polyphenylene sulfide resin composition was prepared in the same manner as in Example 1. The film slightly exhibited self-supporting properties. The polydimethylsiloxane (PDMS) units content of the polyphenylene sulfide resin composition was determined in the same manner as in Example 1 to be 3.8%.

A 0.2-mm-thick dumbbell specimen was punched out of the press film of the polyphenylene sulfide resin composition, and then the specimen was subjected to a tensile test using a Tensilon UTA2.5T tensile tester under the conditions of a chuck distance of 25 mm and a tensile speed of 1 mm/min. The press film had a tensile modulus of 1,000 MPa and a tensile elongation of 3%.

TABLE 1

| | | Example 1 | Example 5 | Comparative Example 1 | Comparative Example 2 | Comparative Example 3 | Comparative Example 4 |
|---|---|---|---|---|---|---|---|
| (A)Polyphenylenesulfide | Used (A)Polyphenylenesulfide | A-1 | A-5 | A-6 | A-7 | A-8 | A-6 |
| | Functional group amount (μmol/g) | 141 | 140 | 59 | 108* | 60 | 60 |
| Polymerization condition | Functional group ratio | 5 | 5 | 5 | 5 | 5 | — |
| Polyphenylenesulfide copolymer | Melting point (° C.) | 278 | 278 | 281 | 278 | 263 | 280 |
| | Glass transition temperature (° C.) | 80 | 77 | 89 | 87 | 74 | 87 |
| | Molecular weight (Mw) | 41,000 | 42,000 | 31,000 | 40,000 | 28,000 | 32,000 |
| | Molecular weight (Mn) | 12,000 | 14,000 | 10,000 | 9,000 | 13,000 | 9,000 |
| | Dispersivity (Mw/Mn) | 3.42 | 3.00 | 3.10 | 4.44 | 2.15 | 3.56 |
| | PDMS** unit amount (wt %) | 3.8 | 4.0 | 2.9 | 3.6 | 3.1 | 3.8 |
| | Condition of film | good | good | bad | bad | bad | fair |
| | Modulus (MPa) | 870 | 860 | — | — | — | 1,000 |
| | Tensile elongation (%) | 8 | 9 | — | — | — | 3 |

Functional group ratio: [(Functional group amount of Polyorganosiloxane (B)/Functional group amount of (A)Polyphenylenesulfide]
*Having functional groups in not end terminal but in main chain;
**PDMS = polydimethylsiloxane
[Condition of film] bad: very bri

TABLE 2

| | | Example 1 | Example 2 | Example 3 | Example 4 | Example 6 |
|---|---|---|---|---|---|---|
| (A)Polyphenylenesulfide | Used (A)Polyphenylenesulfid | A-1 | A-1 | A-1 | A-1 | A-2 |
| | Functional group amount (μmol/g) | 141 | 141 | 141 | 141 | 325 |
| Polymerization condition | Functional group ratio | 5 | 3 | 9 | 9 | 5 |
| | Reaction condition | Melt polymerizatio | Melt polymerizatio | Melt polymerizatio | Solution polymerizatio | Melt polymerizatio |
| | Amount of solvent | — | — | — | 3 | — |
| Polyphenylenesulfide copolymer | Melting point (° C.) | 278 | 278 | 277 | 277 | 273 |
| | Glass transition temperature (° C.) | 80 | 80 | 77 | 72 | 68 |
| | Molecular weight (Mw) | 41,000 | 38,000 | 51,000 | 35,000 | 57,000 |
| | Molecular weight (Mn) | 12,000 | 9,300 | 12,000 | 9,800 | 14,000 |
| | Dispersivity (Mw/Mn) | 3.42 | 4.09 | 4.25 | 3.57 | 4.07 |
| | PDMS unit amount (wt %) | 3.8 | 4.3 | 9.8 | 9.9 | 10.3 |
| | Condition of film | good | good | good | good | excellent |
| | Modulus (MPa) | 870 | 850 | 710 | 710 | 700 |
| | Tensile elongation (%) | 8 | 9 | 10 | 10 | 18 |

TABLE 2-continued

|  |  | Example 7 | Example 8 | Example 9 | Example 10 |
|---|---|---|---|---|---|
| (A)Polyphenylenesulfide | Used (A)Polyphenylenesulfid | A-3 | A-4 | A-3 | A-3 |
|  | Functional group amount (µmol/g) | 478 | 532 | 478 | 478 |
| Polymerization condition | Functional group ratio | 5 | 5 | 5 | 5 |
|  | Reaction condition | Melt polymerizatio | Melt polymerizatio | Solution polymerizatio | Solution polymerizatio |
|  | Amount of solvent | — | — | 3 | 1 |
| Polyphenylenesulfide copolymer | Melting point (° C.) | 270 | 266 | 274 | 270 |
|  | Glass transition temperature (° C.) | 55 | 45 | 43 | 42 |
|  | Molecular weight (Mw) | 52,000 | 46,000 | 35,000 | 52,000 |
|  | Molecular weight (Mn) | 9,700 | 11,000 | 10,000 | 13,000 |
|  | Dispersivity (Mw/Mn) | 5.36 | 4.18 | 3.50 | 4.00 |
|  | PDMS unit amount (wt %) | 14.8 | 19.4 | 27.2 | 28.9 |
|  | Condition of film | excellent | excellent | excellent | excellent |
|  | Modulus (MPa) | 580 | 460 | 260 | 210 |
|  | Tensile elongation (%) | 20 | 28 | 85 | 160 |

Functional group ratio: [(Functional group amount of Polyorganosiloxane (B)/Functional group amount of (A)Polyphenylenesulfide]
Amount of solvent: [Used amount of NMP (mol)/Structural unit of (A)Polyphenylenesulfide (mol)]
[Condition of film] bad: very bri The results of the Examples and Comparative Examples described above will be described by comparison.

In Examples 1 and 5 in Table 1, polyphenylene sulfides (A) having functional group contents of 100 µmol/g or more were used in the copolymerization reaction, whereby polyphenylene sulfide block copolymers having high weight-average molecular weights and low glass-transition temperatures were obtained. The glass-transition temperature of polyphenylene sulfide homopolymer is 90° C. The polyphenylene sulfide block copolymers obtained were flexible and had improved toughness, and the molten films thereof exhibited self-supporting properties.

In Comparative Example 1 where a polyphenylene sulfide produced by the versatile method was used in the copolymerization reaction, block copolymerization did not proceed sufficiently because of a small functional group content of the polyphenylene sulfide. Consequently, the polyphenylene sulfide block copolymer obtained had a low weight-average molecular weight and a high glass-transition temperature. The polyphenylene sulfide block copolymer had unimproved toughness, and the molten film thereof was brittle.

In Comparative Example 2, a polyphenylene sulfide having a functional group not at an end but in its main chain was used in the copolymerization reaction, whereby copolymerization proceeded to provide a copolymer having a relatively high weight-average molecular weight. The copolymer obtained, however, had a structure of graft polymer and, therefore, had insufficient flexibility and a high glass-transition temperature. The molten film of the polyphenylene sulfide copolymer, although having a high weight-average molecular weight, showed no improvement in toughness and, consequently, the molten film was brittle.

In Comparative Example 3, a polyphenylene sulfide oligomer, which has a low molecular weight and a low glass-transition temperature, was used, and thus the copolymer obtained also had a low glass-transition temperature. However, since the functional group content was small, the amount of copolymerized polydimethylsiloxane (PDMS units content) was small, and the molecular weight was low. Consequently, the molten film of the polyphenylene sulfide block copolymer obtained was brittle.

In Comparative Example 4, a polyphenylene sulfide produced by the versatile method and a poly(ether imide-siloxane copolymer) having high toughness and high flexibility were melt kneaded, and thus the molten film slightly exhibited self-supporting properties.

The polyphenylene sulfide resin composition obtained, however, was merely a blend of flexible components, and the primary structure of its main chain was not modified. Therefore, there was no sufficient improvement in toughness and flexibility, as compared to Example 1 where the product obtained was a polyphenylene sulfide block copolymer.

In Examples 2 and 3 in Table 2, the functional group contents of the polyorganosiloxane (B) in copolymerization reaction were respectively 3 equivalents and 9 equivalents relative to the functional group content of the polyphenylene sulfide (A). In both cases, a polyphenylene sulfide block copolymer having a high weight-average molecular weight and a low glass-transition temperature was obtained. The molten films of the polyphenylene sulfide block copolymers obtained were flexible and exhibited self-supporting properties.

In Example 4, copolymerization reaction was carried out in an organic polar solvent, and as in the case of melt polymerization, a polyphenylene sulfide block copolymer having a high weight-average molecular weight and a low glass-transition temperature was obtained. The molten film of the polyphenylene sulfide block copolymer obtained was flexible and exhibited self-supporting properties.

In Examples 6 to 8, polyphenylene sulfides (A) having low weight-average molecular weights but functional group contents of 300 µmol/g or more were used, whereby copolymerization reaction sufficiently proceeded, resulting in polyphenylene sulfide block copolymers having high weight-average molecular weights. In addition, the amount of copolymerization with the polyorganosiloxane (B) increased and, consequently, a dramatically lowered glass-transition temperature was achieved. The molten films of the polyphenylene sulfide block copolymers exhibited very excellent flexibility and self-supporting properties.

In Example 9, solution polymerization was carried out using a polyphenylene sulfide (A) having a low weight-average molecular weight but a functional group content of 300 µmol/g or more, whereby copolymerization reaction sufficiently proceeded, resulting in a further increase in the amount of copolymerization with the polyorganosiloxane (B). Consequently, the molten film of the polyphenylene sulfide block copolymer obtained exhibited very excellent flexibility and toughness.

In Example 10, as compared to Example 9, the polymerization reaction was promoted by controlling the amount of solvent, resulting in a dramatic increase in weight-average molecular weight. Consequently, the molten film of the polyphenylene sulfide block copolymer obtained exhibited very excellent flexibility and toughness.

INDUSTRIAL APPLICABILITY

Our polyphenylene sulfide block copolymer can be molded by various molding methods such as injection molding, extrusion molding, compression molding, blow molding, and injection compression molding, and is particularly suitable for injection molding and extrusion molding. Furthermore, the polyphenylene sulfide block copolymer, for its flexibility, extremely high tensile elongation at break, and high heat aging resistance, is particularly suitable for extrusion molding that requires a relatively high molding temperature and a long melt residence time. Examples of molded articles produced by extrusion molding include round bars, square bars, sheets, films, tubes, and pipes. More specific applications include electrical insulating materials for motors such as water heater motors, air-conditioner motors, and drive motors, film capacitors, speaker diaphragms, recording magnetic tapes, printed board materials, printed board peripherals, semiconductor packages, trays for conveying semiconductors, process/release films, protection films, film sensors for automobiles, insulating tapes for wire cables, insulating washers in lithium ion batteries, tubes for hot water, cooling water, and chemicals, fuel tubes for automobiles, pipes for hot water, pipes for chemicals in chemical plants, pipes for ultrapure water and ultrapure solvents, pipes for automobiles, pipes for chlorofluorocarbons and supercritical carbon dioxide refrigerants, and workpiece-holding rings for polishers. Other examples include molded articles for coating motor coil wires in hybrid vehicles, electric vehicles, railways, and power plants; and molded articles for coating heat-resistant electric wires and cables for household electrical appliances, wire harnesses and control wires such as flat cables used for the wiring in automobiles, and winding wires of signal transformers and car-mounted transformers for communication, transmission, high frequencies, audios, and measurements.

Examples of applications of molded articles obtained by injection molding include electrical equipment components such as generators, electric motors, potential transformers, current transformers, voltage regulators, rectifiers, inverters, relays, power contacts, switches, breakers, knife switches, multipole rods, and electrical component cabinets; electronic components such as sensors, LED lamps, connectors, sockets, resistors, relay cases, small switches, coil bobbins, capacitors, variable capacitor cases, optical pickups, radiators, various terminal boards, transformers, plugs, printed circuit boards, tuners, speakers, microphones, headphones, small motors, magnetic head bases, power modules, semiconductors, liquid crystals, FDD carriages, FDD chassis, motor brush holders, parabolic antennas, and computer-related components; domestic and office electric appliance components such as VTR components, TV components, irons, hair dryers, rice cooker components, microwave oven components, acoustic components, audio equipment components for audios, laserdiscs (registered trademark), and compact discs, illumination components, refrigerator components, air conditioner components, typewriter components, and word processor components; machine-related components such as office computer-related components, telephone set-related components, facsimile-related components, copier-related components, cleaning jigs, motor components, lighters, and typewriters: components of optical and precision instruments such as microscopes, binoculars, cameras, and watches; automobile and vehicle-related components such as alternator terminals, alternator connectors, IC regulators, potentiometer bases for light dimmers, various valves including exhaust gas valves, various pipes for fuels, exhaust systems, and air intake systems, ducts, turboducts, air intake nozzle snorkels, intake manifolds, fuel pumps, engine coolant joints, carburetor main bodies, carburetor spacers, exhaust gas sensors, coolant sensors, oil temperature sensors, brake pad wear sensors, throttle position sensors, crankshaft position sensors, air flow meters, brake pad wear sensors, thermostat bases for air-conditioners, warming hot air flow control valves, brush holders for radiator motors, water pump impellers, turbine vanes, windshield wiper motor-related components, distributors, starter switches, starter relays, transmission wire harnesses, window washer nozzles, air-conditioner panel switch boards, coils for fuel solenoid valves, fuse connectors, horn terminals, electric component insulators, step motor rotors, lamp sockets, lamp reflectors, lamp housings, brake pistons, solenoid bobbins, engine oil filters, and ignition cases; and gaskets for primary batteries and secondary batteries in cellular phones, notebook computers, video cameras, hybrid vehicles, and electric vehicles.

In particular, the polyphenylene sulfide block copolymer is suitable for molded articles for coating motor coil wires in hybrid vehicles, electric vehicles, railways, and power plants; and various pipes for fuels, exhaust systems, and air intake systems and ducts, in particular, turboducts in automobiles, which are exposed to high-temperature environments.

The invention claimed is:

1. A polyphenylene sulfide block copolymer comprising:
    50 to 99% by weight of polyphenylene sulfide units (A); and
    50 to 1% by weight of polyorganosiloxane units (B),
    provided that the total amount of (A) and (B) is 100% by weight, the polyphenylene sulfide block copolymer having a glass-transition temperature of 80° C. or lower and a weight-average molecular weight of 35,000 to 100,000.

2. The polyphenylene sulfide block copolymer according to claim 1, wherein the polyorganosiloxane units (B) are polydimethylsiloxane units.

3. The polyphenylene sulfide block copolymer according to claim 1, wherein the polyorganosiloxane units (B) are contained in an amount of 10 to 40% by weight.

4. The polyphenylene sulfide block copolymer according to claim 1, wherein the polyphenylene sulfide block copolymer has a weight-average molecular weight of 45,000 to 80,000.

5. A method of producing the polyphenylene sulfide block copolymer according to claim 1, comprising:
    heating a polyphenylene sulfide (A) having a functional group content of 100 µmol/g or more and a polyorganosiloxane (B) having functional groups,
    the polyphenylene sulfide (A) being represented by general formula (I):

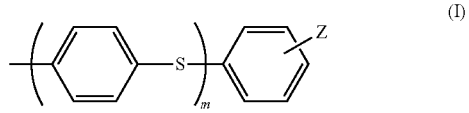

(I)

wherein Z is a reactive functional group selected from a carboxyl group, an amino group, a hydroxyl group, an acid anhydride group, an isocyanate group, an epoxy group, a silanol group, an alkoxysilane group, and derivatives thereof, and m is an integer of 10 or greater.

6. The method according to claim 5, wherein heating the polyphenylene sulfide (A) and the polyorganosiloxane (B) is carried out in an organic polar solvent.

7. The method according to claim 5, wherein the polyorganosiloxane (B) having functional groups has, at its ends, reactive functional groups selected from an epoxy group, a carboxyl group, an amino group, a hydroxyl group, an acid anhydride group, an isocyanate group, a silanol group, an alkoxysilane group, and derivatives thereof.

8. The method according to claim 5, wherein the polyphenylene sulfide (A) having a functional group content of 100 μmol/g or more is a polyphenylene sulfide obtained by heating a mixture comprising at least (i) a sulfidizing agent, (ii) a dihalogenated aromatic compound, (iii) an organic polar solvent, and (iv) a monohalogenated compound having a reactive functional group W, the amount of the monohalogenated compound being 0.01 to 25 mol % per mole of the dihalogenated aromatic compound (ii), the monohalogenated compound being represented by general formula (II):

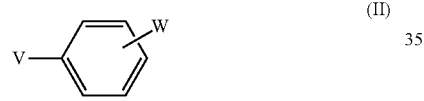

(II)

wherein V represents a halogen.

9. The method according to claim 8, wherein the reactive functional group of the monohalogenated compound (iv) having a reactive functional group W is a functional group selected from a carboxyl group, an amino group, a hydroxyl group, an acid anhydride group, an isocyanate group, an epoxy group, a silanol group, an alkoxysilane group, and derivatives thereof.

10. The method according to claim 5, wherein the polyphenylene sulfide (A) is a polyphenylene sulfide obtained by heating a cyclic polyphenylene sulfide (a) in the presence of a sulfide compound having reactive functional groups, the amount of the sulfide compound being 0.01 mol % to 25 mol % per mole of phenylene sulfide structural units, the sulfide compound being represented by general formula (III):

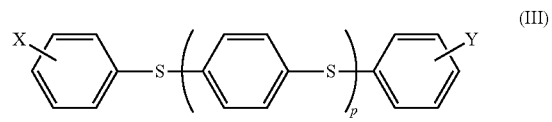

(III)

wherein at least one of X and Y is a functional group selected from a carboxyl group, an amino group, a hydroxyl group, an acid anhydride group, an isocyanate group, an epoxy group, a silanol group, an alkoxysilane group, and derivatives thereof, and p represents an integer of 0 to 20, provided that p may be a single integer or a combination of different integers.

11. The method according to claim 10, wherein the cyclic polyphenylene sulfide (a) is a monomer or a mixture comprising 50% by weight or more of a cyclic polyphenylene sulfide represented by general formula (IV) wherein i is from 4 to 50:

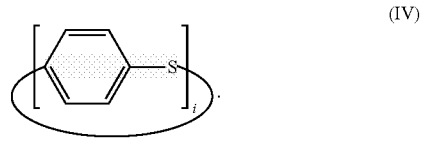

(IV)

12. The method according to claim 10, wherein the polyphenylene sulfide (A) is a polyphenylene sulfide obtained by heating a mixture comprising the cyclic polyphenylene sulfide (a) and the sulfide compound having reactive functional groups in the absence of a solvent.

13. The method according to claim 10, wherein the reactive functional groups of the sulfide compound having reactive functional groups are functional groups selected from an amino group, a carboxyl group, and a hydroxyl group.

14. A molded article comprising the polyphenylene sulfide block copolymer according to claim 1.

* * * * *